US008769480B1

(12) United States Patent
Wagner et al.

(10) Patent No.: US 8,769,480 B1
(45) Date of Patent: Jul. 1, 2014

(54) INTEGRATED ENVIRONMENT FOR DEVELOPING INFORMATION EXCHANGES

(71) Applicant: Crossflo Systems, Inc., San Diego, CA (US)

(72) Inventors: Winfield J. Wagner, San Diego, CA (US); Andrew P. Toto, Encinitas, CA (US)

(73) Assignee: Crossflow Systems, Inc., San Diego, CA (US)

( * ) Notice: Subject to any disclaimer, the term of this patent is extended or adjusted under 35 U.S.C. 154(b) by 0 days.

(21) Appl. No.: 13/940,037

(22) Filed: Jul. 11, 2013

(51) Int. Cl.
 *G06F 9/44* (2006.01)
 *G06Q 30/02* (2012.01)
(52) U.S. Cl.
 CPC ..... *G06Q 30/0201* (2013.01); *Y10S 707/99956* (2013.01)
 USPC ..... 717/101; 717/169; 705/342; 707/999.205
(58) Field of Classification Search
 CPC . G06F 9/44505; G06F 9/543; G06F 15/7885; G06F 17/604
 USPC ............................ 717/101–178; 705/50–912; 707/600–999.206
 See application file for complete search history.

(56) References Cited

U.S. PATENT DOCUMENTS

| | | | | |
|---|---|---|---|---|
| 5,761,499 A | * | 6/1998 | Sonderegger | 717/167 |
| 5,822,580 A | * | 10/1998 | Leung | 717/164 |
| 6,044,374 A | * | 3/2000 | Nesamoney et al. | 1/1 |
| 6,859,821 B1 | * | 2/2005 | Ozzie et al. | 709/205 |
| 7,383,355 B1 | * | 6/2008 | Berkman et al. | 709/246 |
| 8,561,010 B2 | * | 10/2013 | Colgrave et al. | 717/101 |
| 2004/0128670 A1 | * | 7/2004 | Robinson et al. | 718/1 |
| 2004/0186897 A1 | * | 9/2004 | Knauerhase et al. | 709/209 |
| 2004/0221008 A1 | * | 11/2004 | Kunisetty | 709/203 |
| 2005/0102364 A1 | * | 5/2005 | Ozzie et al. | 709/207 |
| 2005/0187794 A1 | * | 8/2005 | Kimak | 705/3 |

(Continued)

OTHER PUBLICATIONS

Combination of Interoperability Registries with Process and Data Management Tools for Governmental Services Transformation—Yannis Charalabidis, Fenareti Lampathaki, John Psarras—Proceedings of the 42nd Hawaii International Conference on System Sciences—2009.*

(Continued)

*Primary Examiner* — Lewis A Bullock, Jr.
*Assistant Examiner* — Francisco Aponte
(74) *Attorney, Agent, or Firm* — Pillsbury Winthrop Shaw Pittman LLP

(57) ABSTRACT

Systems and methods for facilitating an integrated environment for developing information exchanges are disclosed. In such environment, a global registry of conceptual objects for developing information exchanges may be provided. In such an environment, a local registry of conceptual objects may be provided for facilitating a local information exchange standard established for an individual domain. Under the environment, exchange objects may be composed based on the objects in the global registry and/or local registry. The exchange objects may be stored in a repository associated with the individual domain for developing the information exchanges. Exchange artifacts conforming to multiple exchange standards may be generated based on the exchange objects in the repository. The conceptual objects and exchange objects in the local registry and repository associated with the individual domain may be promoted to the global registry; and may be imported from and/or exported to enteral resources.

17 Claims, 17 Drawing Sheets

(56) References Cited

U.S. PATENT DOCUMENTS

| | | | |
|---|---|---|---|
| 2008/0184265 A1* | 7/2008 | Kasi et al. | 719/317 |
| 2008/0294530 A1* | 11/2008 | Ritsch et al. | 705/26 |
| 2009/0006578 A1* | 1/2009 | Schaeck | 709/217 |
| 2010/0262948 A1* | 10/2010 | Melski et al. | 717/101 |
| 2011/0047230 A1* | 2/2011 | McGee | 709/206 |
| 2011/0153351 A1* | 6/2011 | Vesper et al. | 705/2 |
| 2011/0167146 A1* | 7/2011 | Murray et al. | 709/223 |
| 2013/0091058 A1* | 4/2013 | Huster | 705/44 |
| 2013/0262330 A1* | 10/2013 | Sannier et al. | 705/318 |
| 2013/0290269 A1* | 10/2013 | Griffiths et al. | 707/684 |
| 2013/0290399 A1* | 10/2013 | Gordon | 709/201 |
| 2013/0290529 A1* | 10/2013 | Gordon et al. | 709/224 |
| 2014/0082156 A1* | 3/2014 | Jagtap | 709/220 |
| 2014/0095719 A1* | 4/2014 | Decker | 709/226 |

OTHER PUBLICATIONS

Ardire, Philip et al. "Niem User Guide vol. 1," [online], May 20, 2008, retrieved on Jul. 10, 2013 from http://reference.niem.gov/niem/guidance/user-guide/vol1/user-guide-vol1.pdf.

"Niem High-Level Tool Architecture vol. 1.1", [online], Dec. 1, 2008, retrieved on Jul. 10, 2013 from http://reference.niem.gov/niem/specification/high-level-tool-architecture/1.1/high-level-tool-architecture-1.1.pdf.

Chen, Peter Pin-Shan, "The Entity-Relationship Model-Toward a Unified View of Data", *ACM Transactions on Database Systems*, vol. 1, Mar. 1976, pp. 9-36.

Chen, Peter Pin-Shan, "The Entity-Relationship Model—A Basis for the Enterprise View of Data", *AFIPS National Computer Conference*, Jun. 1977, pp. 77-84.

* cited by examiner

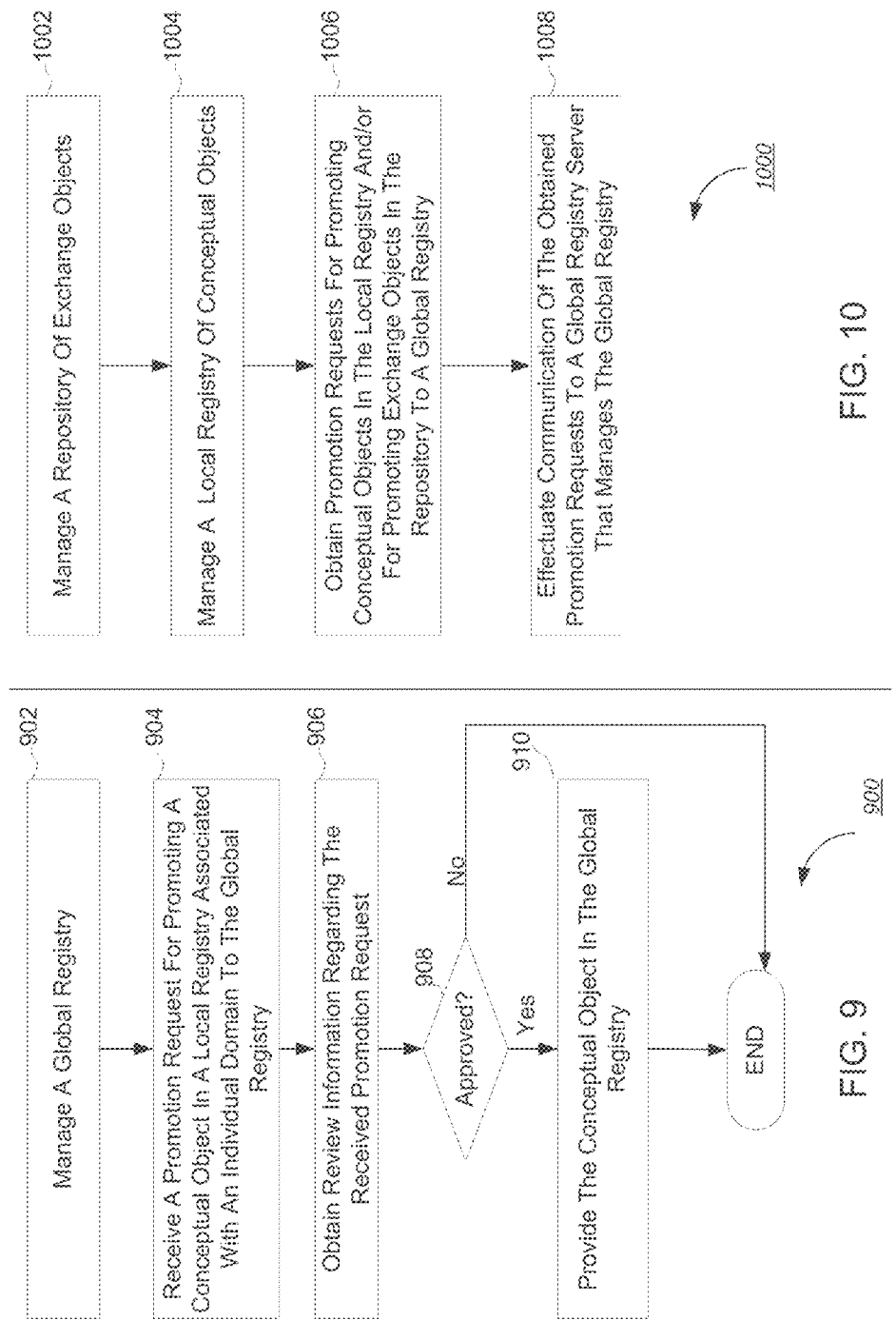

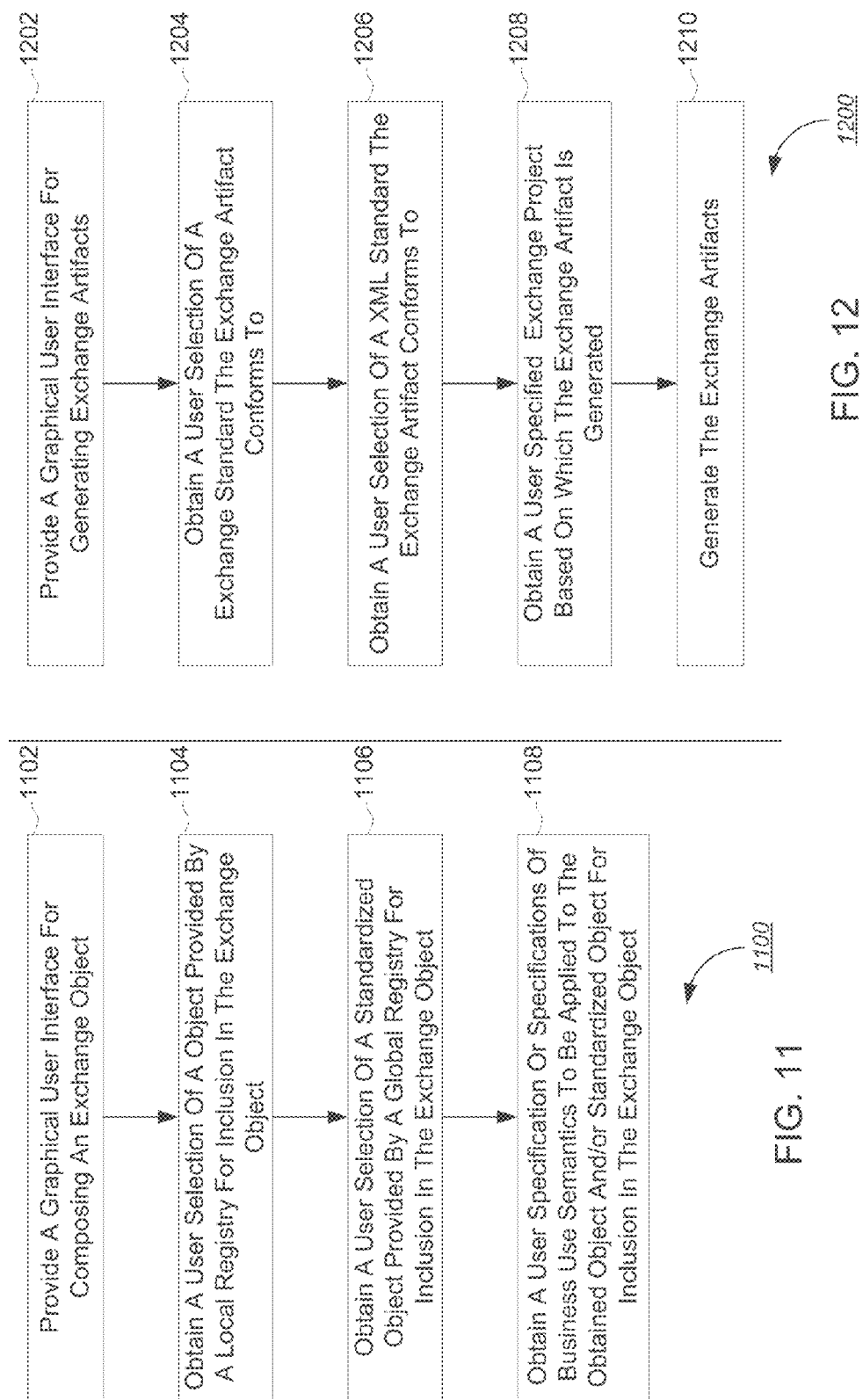

INTEGRATED ENVIRONMENT FOR DEVELOPING INFORMATION EXCHANGES

FIELD OF THE DISCLOSURE

This disclosure relates to facilitating information exchanges between systems through an integrated environment, the integrated environment comprising a global registry, local registries, repositories and/or any other components that facilitate development of the information exchanges.

BACKGROUND

Systems that provide development environments for generating exchange artifacts are known. The exchange artifacts generated by these systems typically include documents describing schemas, metadata, and/or documentations that specify the information exchanges. For facilitating generation of the exchange artifacts, these systems tend to provide information exchange reference models specific to individual business domains or subdomain within a business. As such, these systems lack capabilities to enable the individual businesses to cost-effectively develop individual information exchange standards based on a global information exchange standard for achieving cross-domain or sub-domain consistencies. Moreover, these systems tend to generate exchange artifacts based on a singular exchange standard, e.g., such as the National Information Exchange Model (NIEM), and thus lack capabilities to enable developers of the information exchanges to generate exchange artifacts conforming to different exchange standards while maintaining a consistent business model. Another drawback of these systems is that they lack capabilities to import from and/or export to external resources for creating and/or consolidating the information reference models.

SUMMARY

One aspect of the disclosure relates to providing an integrated development environment facilitating development of information exchanges based on a logical global information exchange standard and one or more local information exchange standards established for individual business domains. Standardized objects corresponding to data elements of the global information exchange standard may be provided in a global registry. Conceptual objects representing concepts for establishing a local information exchange standard reflecting an understanding how information may be represented in an individual domain may be provided in a local registry associated with the individual domain. The conceptual objects in the local registry may be promoted to the global registry upon approvals by an administrator and/or any other authentication body of the global registry. The promoted conceptual objects from one or more local registries may be provided in the global registry for developing information exchanges based on the global information exchange standard. In some examples, the conceptual objects in the local registry may be created or modified based on the standardized objects in the global registry according to business use semantics appropriate for the individual domain such that they represent extensions or augmentations to the corresponding standardized objects in the global registry. In such a development environment, developers of information exchanges may compose exchange objects by including objects in the global registry and/or in the local registry or local registries in the exchange objects. The exchange objects, such as product objects, may be promoted to the global registry for providing best practice guidance. Accordingly, this facilitates an integrated environment that may provide capabilities to enable individual domains to cost-effectively develop consistent information exchanges conforming to a global information exchange standard while adhering to domain the specific local information exchange standard(s).

Generation of exchange projects may be enabled based on the exchange objects and generation of exchange artifacts may be enabled based on the generated exchange projects. In some examples, the exchange projects may be generated by including exchange objects stored in a repository associated with an individual domain. Exchange artifacts conforming to different exchange standards may be generated based on the exchange projects. Examples of such exchange standards may include, but not limited to, the National Information Exchange Model (NIEM), Health Level Seven (HL7), Accredited Standards Committee X12 (ASC X12), and/or any other exchange standards. This may provide flexibilities for developing information exchanges adapted to different types of information exchanges based on different business needs of the individual domains.

Capabilities may be provided for integrating objects provided by external resources with the local information standards established for the individual domains and the global information exchange standard facilitated by the global registry. Such external resources may include, for example, XML schema files, spreadsheet files, database tables and/or any other external resources. In some exemplary implementations, such integrations may include importing from the external resources conceptual objects and/or product objects, analyzing the differences between the external resources and the local registry and/or the global registry, and importing the new objects into the local registry and/or the global registry. This may enhance object creation in a local registry and/or the global registry.

In some implementations, the system that provides a global registry to facilitate information exchanges may include a global registry server. The global registry server may comprise one or more processor configured to execute computer program modules. The computer program modules may include a global registry management module, a promotion request module, a promotion review module, a global registry provision module, an object importation module, an interface module, and/or other modules.

The global registry management module may be configured to manage a global registry of conceptual objects corresponding to data elements and/or object types of a global information exchange standard, which may be established by an authority or any authentication body for providing best practice and/or guidelines for developing individual information exchanges, standardized processes for developing the information exchanges, international or national standards related to information exchanges having specific purposes, and/or for providing any other standards. Conceptual objects corresponding to the data elements of the global information standard may be determined and provided by the authority and/or any authentication body in the global registry. The conceptual objects in the global registry may be used by developers of information exchanges, administrators of local registries associated with individual domains and/or any other entities to develop individual information exchanges and/or to establish local information exchange standard for individual domains. The global registry may be physically implemented in one or more electronic storages. In some exemplary implementations, the conceptual objects in the global registry may be determined, for example, for providing data models facilitating development of individual information exchanges. Examples of such data models may include entity-relationship, network structure, object-oriented, and/or any other data models. In those examples, the conceptual objects may correspond to data elements and/or object types of such data models.

In some examples, for facilitating information exchanges based on the global information exchange standard, product projects may be provided in the global registry. The product objects may represent logic models based on business use semantics commonly adopted, for example, as a best practice. In some exemplary implementations, such a product object may include a set of conceptual objects in the global registry organized in a way reflecting collective knowledge about a specific type of business product or process (e.g., Arrest, Booking, Insurance Application, Insurance Plan, etc.) or information class (Person, Location, Organization, etc.). Such a product object may be used to specify data content of the individual information exchanges.

The global registry management module may manage the global registry by, for example, but not limited to, adding new conceptual objects to the global registry, modifying the conceptual objects, removing the conceptual objects, deprecating the conceptual objects (e.g., obsoleting the conceptual objects for future development by deactivating the conceptual objects), locating the conceptual objects, and/or any other management operations for managing the global registry. In some exemplary implementations, programming rules, such as an indexing scheme and/or other rules, may be preconfigured into the global registry management module at a configuration stage to facilitate the global registry management operations performed by global registry management module.

In some exemplary implementations, the conceptual objects in the global registry may represent entity-relationship concepts and/or business use semantics. Such entity-relationship concepts may include, for example, entities, roles, relationships, actions, elements, and/or any other entity-relationship concepts. In these exemplary implementations, business use semantics may be applied to the conceptual objects to reflect collective knowledge about such conceptual objects. In these exemplary implementations, product objects may be provided to indicate relationships of entities represented by the conceptual objects in the global registry.

The promotion receipt module may be configured to receive promotion requests for promoting conceptual objects in local registries associated with individual domains to the global registry. The individual domains may include organizations, agencies, departments, subsidiaries, local governments, and/or any other logical groups characterized by specific functions, features, responsibilities, and/or line of businesses. Such an individual domain may exchange information within the domain and/or with other domains. For establishing local information exchange standard at a domain level, an administrator, developer, provider, and/or any other entities related to domain level information exchange may employ local registries for providing objects corresponding to data elements of the local information exchange standard. The objects in the local registries, e.g., conceptual objects, may represent knowledge about how information may be represented at the domain level. Similar to those objects in a global registry, the objects in local registries may be applied with business use semantics, which may be specific to the individual domains. A promotion request may be generated by, for example, by an administrator, developer, provider or any other entities related to information exchange for a domain to promote the objects, including conceptual objects, in the local registry to the global registry managed by the global registry management module. The promotion receipt module may be configured to receive such a promotion request via any suitable wired or wireless connections. This may involve detecting promotion requests as they arrive, serializing the arrived the promotion requests, detecting boundaries of the promotion requests, parsing the promotion requests, and/or any other operations for receiving the promotion requests.

The promotion review module may be configured to obtain review information indicating approvals of the promotion requests received by the promotion receipt module. In response to a promotion request received by the promotion receipt module, one or more reviews may be performed for determining whether the object(s) being requested by the promotion request may be promoted to the global registry. Considerations such as whether the to-be-promoted object(s) conforms to the global information exchange standard embodied by the global registry, whether a similar object(s) has existed in the global registry, whether the to-be promoted object reflects information element(s) and/or structure(s) commonly understood by other domains that follow the global information exchange standard, and/or any other considerations. In some examples, the reviews may be performed by the promotion review module automatically by employing programming rules simulating these considerations. Simultaneously or alternatively, the reviews may be performed by one or more authenticators, administrators, providers, and/or any other entities related to establishing the global information exchange standard via an interface, for example, provided by the interface module to perform the reviews. The promotion review module may obtain such review information and determine whether the promotion request has been approved. This may involve recognizing the result(s) of the review as indicated in the obtained review information, accounting number of approvals and/or denials in the obtained review information, assigning weighted score to the approvals and/or denials based on significances of the reviewers, and/or any other operations for determining an approval of a promotion request.

The global registry provision module may be configured to provide objects, including conceptual objects promoted from local registries, in the global registry to client computers associated with developers of the information exchanges. For accessing the objects in the global registry, the client computers may transmit access requests for accessing the objects in the global registry. For facilitating such access requests, the global registry provision module may be configured to provide interfaces for communicating with the client computers. The interfaces may include application programming interfaces (API), common gateway interfaces, web interfaces, and/or any other interfaces that may facilitate client computers accessing the objects in the global registry.

The object importation module may be configured to import from external resources, such as the external resources, conceptual objects and/or project objects to the global registry. Such external resources may include XML files, spreadsheets, database tables and/or any other external resources that may provide definitions and/or descriptions of conceptual objects and/or project objects. For facilitating such importation, the object importation module may analyze the external resources and determine which objects defined and/or described in the external resources but not yet provided in the global registry, extract these determined objects from the external resources, creating these objects according to the definitions and/or descriptions of the objects as indicated in the external resources, storing these objects in the global registry such that they may be provided to the client computers by the global registry provision module, and/or performing any other operations for importing objects from the external resources to the global registry.

The interface module may be configured to generate information for providing graphical user interfaces implemented on client computers to enable user actions for managing the promotion requests received by the promotion receipt module. The information generated by the interface module may cause electronic displays coupled to the client computers, e.g., such as the client computers as illustrated, to present a graphical user interface for managing the promotion requests. User actions may be enabled by controls provided by the graphical user interface, such as, but not limited to, navigation trees, selection boxes, text input boxes, radio buttons, and/or any other field controls. The enabled user actions may include actions for managing the promotion requests, e.g., for approving the promotion requests. Such user actions may be executed, for example, to cause the promotion review module to obtain review information and to determine whether promotion requests have been approved. The information generated by the interface module may include HTML code, view information, information indicating graphics for presentation on the client computers, and/or any other information.

In some implementations, the system that provides a repository and a local registry to facilitate information exchanges may include a domain server. The domain server may comprise one or more processors configured to execute one or more computer program modules. The computer program modules may include a repository module, a local registry module, a promotion request module, an object importation module, and/or other modules.

The repository module may be configured to manage a repository of exchange objects. The exchange objects may correspond to data elements of exchange artifacts that facilitate the actual information exchanges. As such, the exchange objects may specify various aspects of information exchanges, such as, exchange metadata, exchange payload, one or more services being facilitated by the information exchanges, and/or any other aspects of the information exchanges. In some exemplary implementations, the exchange objects in the repository managed by the repository module may comprise product objects based on information exchange needs of the domain. The product objects may be used to specify data content—i.e., the payload of the information exchanges. In some examples, the repository managed by the repository module may be physically implemented using one or more electronic storages. The exchange objects in those examples may be stored in files, databases, tables, records, and/or any storage units in the electronic storages.

The local registry module may be configured to manage a local registry of conceptual objects corresponding to data elements of an information exchange standard established for the domain, e.g., a local information exchange standard. The local information exchange standard may reflect an understanding how information in the individual domain may be represented, best practice for developing information exchanges within the individual domain, standardized process for developing information exchanges within the individual domain, and/or any other local standards. Data models for facilitating such a local information standard may be determined by an administrator, developer, provider, and/or any other entities related to information exchanges of the individual domain and provided through the local registry. The data models may include conceptual concepts corresponding to entity-relationship, network structure, object oriented, and/or any other data models for facilitating the local information exchange standard.

The local registry module may be configured to manage the local registry by, for example, adding new conceptual objects to the local registry, modifying the conceptual objects, removing the conceptual objects, deprecating the conceptual objects, locating the conceptual objects, and/or to performing any other management operations for managing the local registry.

The promotion request module may be configured to obtain promotion requests for promoting conceptual objects in the local registry and/or for promoting product objects in the repository to the global registry. A promotion request obtained by the promotion request module may include information indicating specific objects, including conceptual and/or product objects, in the local registry and/or repository to be promoted to the global registry, one or more developers or entities that created the objects in the local registry, textual descriptions of the objects, textual descriptions of reasons why the objects may be promoted to the global registry, and/or any other information facilitating promotion of objects in a local registry to the global registry.

The object importation module may be configured to import from external resources information indicating one or more conceptual objects to the local registry, and/or one or more product objects to the repository. Such external resources may include exchange artifacts facilitating specific information exchanges, XML files specifying one or more objects, spreadsheet files specifying schema or views of information, and/or any other external resources that may provide definitions of conceptual objects and/or project objects. For facilitating such importation, the object importation module may analyze the external resources and determine which objects are defined, described and/or otherwise provided in the external resources but not yet provided in the global registry, extract these objects from the external resources, create these objects according to the definitions and/or descriptions of the objects as indicated in the external resources, store these objects in the local registry and/or the repository, and/or perform any other operations for importing objects from the external resources to the local registry and/or repository.

In some implementations, the system that generates exchange artifacts pertaining to information exchanges may comprise one or more processors configured to execute one or more computer program modules. The computer program modules may include an object module, an exchange object composition module, an exchange project composition module, an exchange artifact generation module, an interface module and/or other modules.

The object module may be configured to obtain standardized objects in a first set of registries facilitating global information exchange standards and to obtain conceptual objects in a second set of registries facilitating information exchange standards established for individual domains. The first set of registries may include global registries provided by servers such as one or more of the global registry server, via the global registry provision module. The global information exchange standards facilitated by the first set of registries may provide best practice and/or guidelines, e.g., by defining elements, syntax, and/or structures for information exchanges, standardized process for conducting information exchanges, international information standards, standards established for exchanging information related to a general purpose, the and/or any other global information exchange standard. The standardized objects obtained by the object module from the first set of registries may include components of reference models provided by those registries for facilitating global information exchange standards, components of data models provided by those registries that represent collective knowledge about how information should be represented in an exchange, objects that may be readily used to a start information exchange as they are commonly used by most of the information exchanges associated with those registries, and/or any other standardized objects provided by those registries. In some examples, such standardized objects may include conceptual objects and/or product objects provided by those registries for establishing corresponding global information exchange standards as described above.

The second set of registries may include local registries provided by servers such as one or more of a domain server for establishing local information exchange standards for individual domains. The object module may be configured to obtain conceptual object from the second set of local registries that facilitate the local information exchange standards established for the individual domains. The conceptual objects obtained by the object module from the second set registries may include conceptual objects representing business concepts of the corresponding domains, conceptual objects representing one or more local code value lists—i.e. local code values and literals corresponding to objects provided by the first set of registries, conceptual objects representing reusable components in individual information exchanges, and/or any other conceptual objects.

In any case, for obtaining the objects, the object module may be configured with semantics such as identities of one or more servers providing the first and second sets of registries, network protocols for interacting with those servers, interface information for accessing the first set of registries and/or second set of registries, and/or any other semantics for obtaining the standardized objects from the global registries and the local registries.

The exchange object composition module may be configured to enable users to compose exchange objects corresponding to data elements of individual information exchanges by using the standardized objects and/or the conceptual objects obtained by the object module. Such exchange objects may correspond to data elements of exchange artifacts, which may be any tangible and potentially reusable documentations and/or output pertaining to any existing or potential information exchange. The exchange object composition module may enable users to compose exchanged objects by facilitating the users to include objects obtained by the object module in the to-be-composed exchange objects. In some exemplary implementations, an exchange object composition may be enabled by allowing users to specify information structure by adding objects to a directory tree representing the exchange object, to specify required information elements and/or optional requirements for the exchange object, to specify one or more conditions precedent to the exchange object, to specify default value lists for the exchange objects, a privacy level for the exchange object, to specify a security level of the exchange object, maximum and/or minimum data length, and/or to specify any other aspects that may be associated with the exchange object.

The project composition module may be configured to enable the users to compose exchange projects that specify individual information exchanges by using user composed exchange objects. An exchange project may be composed by a user to include a collection of one or more information exchanges for a specific purpose and may be implemented by exchange servers to carry out the one or more information exchanges. As such, the exchange project, in some examples, may comprise business requirements, process, exchange metadata, message payloads and/or any other events governing the information exchanges included in the exchange project. The project composition module may enable users to compose exchange projects by using user composed exchange objects.

The artifact generation module may be configured to generate exchange artifacts representing documentations and/or outputs of the individual information exchanges based on the user composed exchange projects. The generated exchange artifacts may conform to one or more exchange standards, the National Information Exchange Model (NIEM), Health Level Seven (HL7), Accredited Standards Committee X12 (ASC X12), and/or any exchange standard. In some examples, one or more artifacts may be generated based on a user composed exchange project and make up exchange documentation such as a NIEM Information Exchange Package Documentation (IEPD). For generating such exchange artifacts, the artifact generation module may obtain information such as set type information for the exchange artifacts to be generated based on the user composed exchange project (e.g., NIEM, HL7, ASC X12, and so on), a XML standard for generating the artifacts (e.g., NIEM 2.1), schema style (e.g. hierarchical, associative, attribute), a source or sources from which the underlying exchange project may be obtained, a name to identify the generated exchange artifacts, and any other information for generating the exchange artifacts. Programing rules, specifications, and/or semantics may be configured with the artifact generation module, which may include semantics for parsing the underlying exchange project, semantics for generating the exchange artifacts using the XML standard and exchange standard specified by the users, semantics for packaging the generated exchange artifacts based on the exchange standards specified by the users.

The interface module may be configured to generate graphical user interfaces enabling the users to perform actions to manage the conceptual objects in the local registries, to compose exchange objects, to compose exchange projects, to generate exchange artifacts, and/or to perform any other user actions. The information generated by the interface module may cause electronic displays coupled to the client computers to present a graphical user interface for managing the conceptual objects in the local registries, composing exchange objects, composing exchange projects, generating exchange artifacts, and/or any other user actions. The information generated by the interface module may include HTML code, view information, information indicating graphics for presentation on the client computers, and/or any other information.

These and other features, and characteristics of the present technology, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention. As used in the specification and in the claims, the singular form of "a", "an", and "the" include plural referents unless the context clearly dictates otherwise.

BRIEF DESCRIPTION OF THE DRAWINGS

FIG. 9 illustrates a method of promotion a conceptual object in a local registry to a global registry.

FIG. 10 illustrates a method of obtaining and communicating promotion requests for promoting conceptual objects in a local registry and exchange objects in a repository to a global registry.

FIG. 11 illustrates a method of enabling users to compose an exchange object in accordance with the disclosure.

FIG. 12 illustrates a method of enabling users to generate exchange artifacts in accordance with the disclosure.

DETAILED DESCRIPTION

Figure 1:
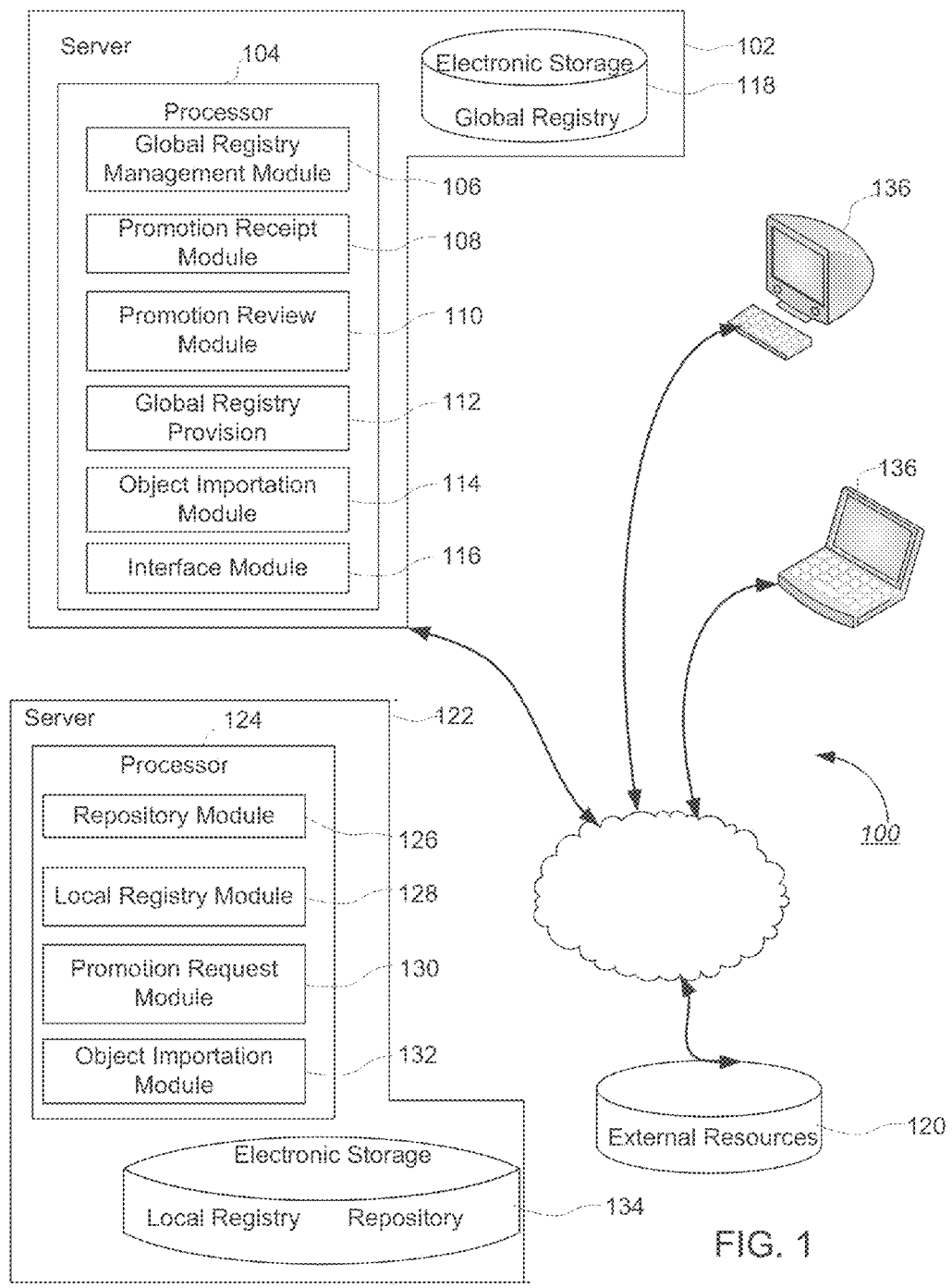
FIG. 1 illustrates one example of providing an integrated environment for developing information exchanges using a global registry server, a domain server, and client computers.
Figure 1A:
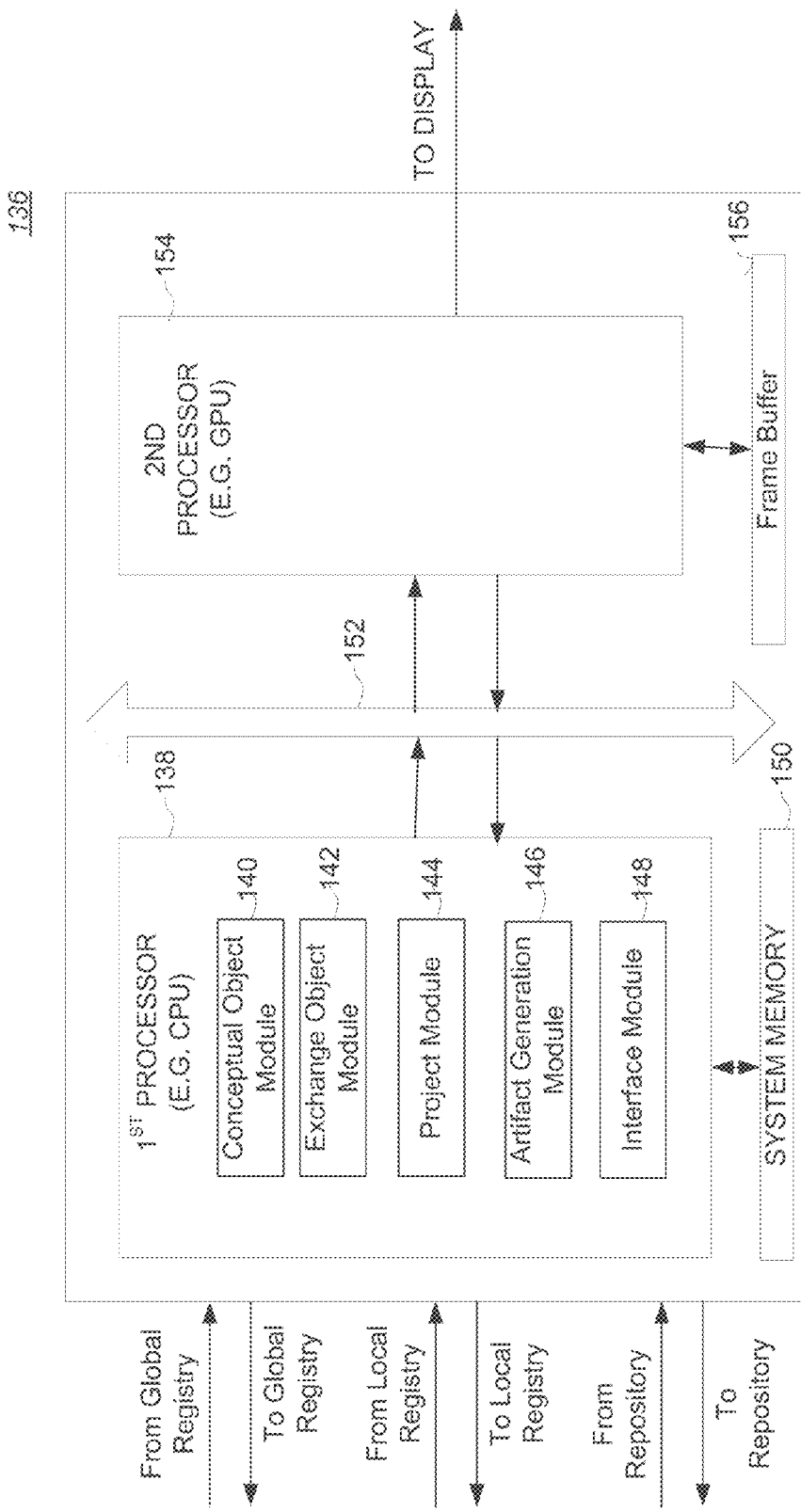
FIG. 1A illustrates one example of a client computer as shown in FIG. 1.

FIG. 1 illustrates one example of providing an integrated environment 100 for developing information exchanges using a global registry server 102, a domain server 122, and client computers 136. As illustrated in FIG. 1, in this example, the global registry server 102, the domain server 122 and the client computers 136 may be configured to communicate with one via any wired or wireless network according to a client/server architecture. Users, such as developers, administrators, providers, moderators, and/or any other entities related to the information exchanges may be facilitated and enabled to access the global registry server 102 and/or the domain server 122 via client computers 136. FIG. 1A illustrates an example of client computer 136 in accordance with the disclosure. It is understood that although only one global registry server 102, and a local registry server 122 are illustrated in this example, the number of the global registry server 102 and/or the local registry server may vary. For example, multiple global registry servers and/or local registries may be employed in other examples for providing the integrated environment for developing information exchanges in accordance with the disclosure.

As illustrated, in this example, the global registry server 102 comprises a processor 104 configured to execute computer program modules. The computer program modules may comprise a global registry management module 106, a promotion receipt module 108, a promotion review module 110, a global registry provision module 112, an object importation module 114, an interface module 116, and/or any other computer program modules. As also illustrated, in this example, the domain server 122 comprises a processor 124 configured to execute computer program modules. The computer program modules executed on the processor 124 may comprise a repository module 126, a local registry server 128, a promotion request module 130, an object importation module, and/or any other computer program modules.

The global registry management module 106 may be configured to manage a global registry of conceptual objects corresponding to data elements and/or object types of a global information exchange standard, which may provide a basis on which individual information exchanges may be developed. Such a global information exchange standard may be established by an authority or any authentication body for defining standardized information elements and/or structures of information exchanges. As such, the global information exchange standard may provide best practice and/or guidelines for developing individual information exchanges, standardized processes for developing the information exchanges, international or national standards related to information exchanges having specific purposes, and/or any other standards. For example, a global information exchange standard may be established for a nationwide hospital group having regional member groups that exchange health care information within the individual member groups and/or between one another. In that example, a global information exchange standard may be established for the nationwide hospital governance body or association to define information elements and/or structures representing a national standard of how the health care information should be represented within the nationwide hospital group. As such, the global information exchange standard for the nationwide hospital governance body or association may specify data requirements for the health care information, for example, such as that information representing a patient must include a patient identification understood through all member groups of the nationwide hospital group. Such data requirements may be used as a basis for developing individual information exchanges for meeting the data requirements specified by the global information exchange standard for the nationwide hospital group.

For representing such a global information exchange standard, conceptual objects may be provided in a global registry. In some implementations, the global registry may be physically implemented through one or more electronic storages coupled to or included in the system 102, such as electronic storage 118 as illustrated. In some examples, the physical implementation of the global registry may include one or more files, records, tables, arrays, data structures, and/or any other data objects stored in the electronic storages.

In any case, the conceptual objects in the global registry may be determined by an authenticator, an administrator, a provider, a developer and/or any other entities related to establishing the global information exchange standard. In some exemplary implementations, the conceptual objects may be determined for providing data models, which may represent cross-domain views of how the information may be represented and/or exchanged, best practices for developing information exchanges, standardized processes for developing information exchanges, international or national standard related to information exchanges having specific purposes, and/or any other standards. Examples of such data models may include entity-relationship, network structure, object-oriented, and/or any other data models. The conceptual objects in the global registry may correspond to data elements and/or object types of the global information exchange standard. As an example for illustration, a global information exchange standard may be established by an authority to include an object type of employee of a nationwide hospital group. In that example, the authority may determine that the employee object type should have data elements corresponding to the name, gender, birthdate, salary, employee number, and any other properties associated with an employee of the hospital group. To facilitate a global information exchange standard for the nationwide hospital group, a conceptual object, i.e., an employee object, having various attributes corresponding to those data elements may be provided.

In some examples, for facilitating information exchanges based on the global information exchange standard, product objects may be provided in the global registry managed by the global registry management module 106. The product objects may represent logic models based on business use semantics commonly adopted, for example, as best practice. In some exemplary implementations, such a product object may include a set of conceptual objects in the global registry organized in a way reflecting collective knowledge about a specific type of information exchange. Such product objects may be used to specify specific document types or data payload fields for the information exchanges. As an example of illustration, a person data product object may be provided in a global registry for providing a best practice how information related to a person may be represented in an information exchange. In that example, the person data object may include a set of conceptual objects in the global registry, such as birthdate, physical description, physical feature, surgery history, preventive care history, and/or any other conceptual objects determined by an administrator, provider, developer and/or any other entities related to establishing the global information exchange standard as the best practice for representing information related to a person in an information exchange.

In any case, the global registry management module 106 may be configured to manage the global registry. This may include adding new conceptual objects to the global registry, modifying the conceptual objects, removing the conceptual objects, deprecating the conceptual objects (e.g., making the conceptual objects obsolete for future development by deactivating the conceptual objects), locating the conceptual objects, and/or any other management operations for managing the global registry. In some exemplary implementations, programming rules, such as indexing schemes and/or other rules, may be preconfigured into the global registry management module 106 at a configuration stage to facilitate the global registry management operations performed by global registry management module 106. In some examples, interfaces for managing the global registry may be provided by, for example, by the interface module 116, to facilitate the administrator, developer and/or any entity that is authorized to manage the global registry to initiate user actions that cause the global registry management module 106 to execute the global management operations.

In some exemplary implementations, the conceptual objects in the global registry may represent entity-relationship concepts and business use semantics. Such entity-relationship concepts and business use semantics may be used by an information exchange developer to specify information involved in an exchange as, for example, entities, roles, relationships, actions, elements, and/or any other entity-relationship concepts. An entity may represent a logical grouping of elements that describe a real world thing and may be used to represent information capturing that real world thing. Examples of an entity may include person, location, vehicle, telephone number and/or any other entities. Different types of relationships may exist between entities as how the entities may relate to one another in the real world. Entities having relationships may play roles in the relationships. For example, a person entity may play a role of a patient, a victim, an insurer, and/or any other roles. An action may correspond to a context of a type of work or process that may be applied to or acted on an entity. For example, an incident entity may include actions such as, but not limited to, "occurred", "reported", "approved", "updated" and/or any other action. For an entity representing a court event, the associated actions may include "scheduled", "occurred", "published" and/or any other actions. An element may be a single, unique piece of information or an atomic descriptive attribute that describes something about an entity, role, or action. Examples of an element may include, age of a person, a charge of a suspect, salary of an employee, time of an action, and/or any other atomic descriptive attributes. An enumeration may be a set of values that can be assigned to an element. For example, an age of a person may be a value in a set having integers ranging from 0 to 120, a charge of a suspect may be a value representing criminal penalties that may be charged on a suspect under the Law and so on.

In these exemplary implementations where conceptual objects representing entity-relationship concepts are provided in the global registry, business use semantics may be applied to the conceptual objects by the authenticator, administrator, developer, and/or any other entities that may author conceptual objects. The business use semantics may reflect collective knowledge about such conceptual objects. Example of the business use semantics may include required and/or optional elements for the entities, required actions for entities, constraints for applying relationships to the entities, constraints on entities to play specific roles, and/or any other business use semantics that may be applied to the conceptual objects representing the entity-relationship concepts. As an example for illustration, business use semantics specifying that a person must have a social security number may be applied to a conceptual object representing a person entity; business use semantics specifying that a suspect must not have misdemeanor charges; a person may play a role as patient, but may not play a role as a department of an organization; and so on.

In these exemplary implementations where conceptual objects representing entity-relationship concepts are provided in the global registry, product objects may be provided to indicate relationships of entities represented by the conceptual objects in the global registry. For example, a product object of prescription may include a personal entity playing a role as doctor, another person entity playing a role as a patient, an entity representing a drug, and a prescribing action that may be acted on the drug. In that example, the business use semantics as determined by an administrator of the global registry may specify that a range of values representing specific drugs may be prescribed.

The promotion receipt module 108 may be configured to receive promotion requests for promoting conceptual objects in local registries associated with individual domains to the global registry. The individual domains may include organizations, agencies, departments, subsidiaries, local governments, and/or any other logical groups characterized by specific functions, features, responsibilities, and/or line of businesses. For example, within an enterprise, subsidiaries may make up individual domains having corresponding lines of businesses; within a court system, regional courts may make up a court domain characterized by a corresponding jurisdiction; within a federal government entity (e.g., such as the Environment Protection Agency), local EPA agencies may make up individual domains; and so on. Such an individual domain may exchange information within the domain. For instance, business groups and/or departments within a subsidiary of an enterprise may exchange information with one another; local courts in a court domain may exchange information with one another; and so on. An individual domain exchange information with other domains. For example, subsidiaries of the enterprise may exchange information with one another; court domains may exchange information with one another; and so on.

For establishing local information exchange standard at domain level, an administrator, developer, provider, and/or any other entities related to domain level information exchange may employ local registries for providing objects corresponding to data elements of the local information exchange standard. The objects in the local registries may represent knowledge about how information may be represented at a domain level. Similar to those objects in a global registry, the objects in local registries may be applied with business use semantics, which may be specific to the individual domains. For example, a domain of a regional hospital group may provide a conceptual object of a room corresponding to hospital room in the regional hospital group. Business use semantics, such as, without limitations, a maximum number of floors (e.g., $10^{th}$ floor) a room may be on, may be applied to the room conceptual object in the local registry to reflect that the hospitals in the regional hospital group do not have more than 10 floors, which may not be true for other hospitals in other regional hospital groups.

In accordance with one aspect of the disclosure, a promotion request may be generated, for example, by an administrator, developer, provider or any other entities related to information exchange for a domain to promote the objects the local registry to the global registry managed by the global registry management module 106. Such a promotion request may include information indicating specific objects, including conceptual objects in the local registry, to be promoted to the global registry, one or more developers or entities that created the objects in the local registry, textual descriptions of the objects, textual descriptions of a reason or reasons why the objects may be promoted to the global registry, and/or any other information facilitating promotion of objects in a local registry to the global registry.

The promotion receipt module 108 may be configured to receive such a promotion request via any suitable wired or wireless connections. For receiving the promotion request, the promotion receipt module 108 may be configured to detect promotion requests as they arrive, serialize the receipt of the promotion request, detect boundaries of the promotion request, parse the promotion request, and/or perform any other operations for receiving the promotion requests. In some examples, programming rules that specify, for example, delimiters signifying a beginning and end of a promotion requests, number of fields in a promotion request, length of each fields, information type of each field (e.g., textual strings for the description field), and/or any other programming rules may be configured into the promotion receipt module 108 for receiving the promotion requests. In some examples, the promotion receipt module 108 may be configured to receive the promotion requests at a frequency predetermined by the provider, administrator, and/or any other entities related to the global registry. In some examples, the promotion receipt module 108 may be configured to dynamically receive the promotion requests as they are pushed to the system 102.

In some examples where a promotion request for promoting a product object to the global registry is received by the promotion receipt module 108, the promotion receipt module 108 may be configured to generate one or more promotion requests for promoting conceptual objects included in the to-be-promoted product objects. For example, in a case where a promotion request for promoting a product object presenting a "Victim Information" having an entity object of "Person" is received, the promotion receipt module 108 may generate a promotion request to promote the "Person" entity to the global registry The promotion review module 110 may be configured to obtain review information indicating approvals and, in some examples, denials of the promotion requests received by the promotion receipt module 108. In response to a promotion request received by the promotion receipt module 108, one or more reviews may be performed for determining whether the object(s) being requested by the promotion request may be promoted to the global registry. Considerations such as whether the to-be promoted object(s) conforms to the global information exchange standard embodied by the global registry, whether a similar object(s) has existed in the global registry, whether the to-be promoted object reflects information element(s) and/or structure(s) as a best practice, and/or any other considerations. Based on such considerations, reviews may be performed. In some examples, the reviews may be performed by the promotion review module 110 by employing programming rules simulating these considerations. For instance, logic representing decision trees based on such considerations may be configured into the promotion review module 110 such that the promotion review module 110 may review the promotion request automatically. Simultaneously or alternatively, the reviews may be performed by one or more authenticators, administrators, providers, and/or any other entities related to establishing the global information exchange standard via an interface, for example, provided by the interface module 116 to perform the reviews.

In any case, the promotion review module 110 may be configured to obtain such review information and determine whether the promotion request has been approved. In some examples, the review information may readily indicate an approval of the review(s) of the promotion request. In some examples, the review information may indicate a number of approvals by, for example, a number of authenticators, and a number of denials by another number of authenticators. In those examples, the promotion review module 110 may be configured to determine whether the promotion request has been finally approved. For such determination, for example, weighted scores may be assigned to different approvals and denials based on significance of the authenticators. Programming rules such as escalating the review upon gathering a number of approvals above a threshold may be configured into the promotion review module 110.

The global registry provision module 112 may be configured to provide objects, including conceptual objects promoted from local registries, in the global registry to client computers associated with developers of the information exchanges. The provision of the objects in the global registry by the global registry provision module 112 may be made in response to object access requests by the client computers, e.g., such as the client computers 136 as illustrated. For accessing the objects in the global registry, the client computer may transmit an access request to the system 102. In response to such an access request from the client computer, the global registry provision module 112 may provide the requested objects to the client computer via any suitable wired or wireless connections between the client computer and the system 102. In some examples, for facilitating such provisions, the global registry provision module 112 may be configured to provide interfaces for communicating with the client computers. Such interfaces may include application programming interfaces (API), common gateway interfaces, web interfaces, and/or any other interfaces that may be provided to the client computers to access the objects in the global registry.

The object importation module 114 may be configured to import from external resources, such as the external resources 120, information indicating conceptual objects and/or project objects to the global registry. Such external resources may include XML files, spreadsheet files, database tables and/or any other external resources that may provide definitions of conceptual objects and/or project objects. For facilitating such importation, the object importation module 114 may analyze the external resources and determine which objects are provided by the external resources but not yet provided in the global registry, extract these objects from the external resources and/or creating these objects according to the definitions of the objects as indicated in the external resources, store these objects in the global registry such that they may be provided to the client computers by the global registry provision module 112, and/or perform any other operations for importing objects from the external resources to the global registry.

The interface module 116 may be configured to generate information for providing graphical user interfaces implemented on client computers to enable user actions for managing the promotion requests received by the promotion receipt module 108. The information generated by the interface module 116 may cause electronic displays coupled to the client computers, e.g., such as the client computers 136 as illustrated, to present a graphical user interface for managing the promotion requests. User actions may be enabled by controls provided by the graphical user interface, such as, but not limited to, navigation trees, selection boxes, text input boxes, radio buttons, and/or any other field controls. The enabled user actions may include actions for managing the promotion requests, e.g., for approving the promotion requests. Such user actions may be executed by the system 102, for example, to cause the promotion review module 110 to obtain review information and to determine whether promotion requests have been approved. The information generated by the interface module 116 may include HTML code, view information, information indicating graphics for presentation on the client computers, and/or any other information.

The repository module 126 may be configured to manage a repository of exchange objects. The exchange objects may correspond to data elements of exchange artifacts that facilitate the actual information exchanges. As such, the exchange objects may specify various aspects of information exchanges, such as, exchange metadata that specify description, administration, legal requirements, technical functionality, use and usage, and/or preservation of the information, exchange payload that specify data content of the information exchanges (e.g., the actual information being exchanged), one or more services being facilitated by the information exchanges, and/or any other aspects that may specify the information exchanges.

In some exemplary implementations, the exchange objects in the repository managed by the repository module 126 may comprise product objects based on information exchange needs of the domain. The product objects may be used to specify data content—i.e., the payload of the information exchanges. The product objects may be promoted to a global registry, e.g., via a promotion request obtained by the promotion request module. A product object in the repository of the domain may comprise one or more conceptual objects from the global registry and/or one or more conceptual objects from the local registry. These objects may be organized in the product object in a way to reflect a logical grouping in accordance with the business purpose, domain level information exchange standard, business rules and/or any other semantics associated with the domain. For example, a law enforcement domain may have a product object representing an incident report, which may comprise a victim entity from a global registry facilitating a global information exchange standard (e.g., the national victim information exchange standard), an offender entity from a local registry associated with the law enforcement domain that represents all possible offenders under the laws enforced by the law enforcement domain, and so on.

In some examples, the repository managed by the repository module 126 may be physically implemented using one or more electronic storages, such as the electronic storage 134 as illustrated. The exchange objects in those examples may be stored in files, databases, tables, records, and/or any storage units on the electronic storages. For managing the repository, the repository module 126 may be configured with data paths, file location, database table names, query strings, and/or any other semantics for accessing the repositories. The management operations of the repository module 126 may include, but not limited to, adding, deleting, modifying, deprecating, locating, consolidating, promoting and/or any other operations for managing the repository.

The local registry module 128 may be configured to manage a local registry of conceptual objects corresponding to data elements of an information exchange standard established for the individual domain, e.g., a local information exchange standard. The local information exchange standard may reflect an understanding how information in the individual domain may be represented, best practice for developing information exchanges within the individual domain, standardized process for developing information exchanges within the individual domain, and/or any other local standards. Data models for facilitating such a local information standard may be determined by an administrator, developer, provider, and/or any other entities related to information exchanges of the individual domain and provided through the local registry. The data models may include conceptual objects corresponding to entity-relationship, network structure, object oriented, and/or any other data models for facilitating the local information exchange standard.

By way of a non-limiting example, a local information exchange standard of a law enforcement domain may be established to represent information elements, structures, business use semantics, constraints, and/or any other aspects of the information in the law enforcement domain. Conceptual objects such as offender, charge, victim, incident, and/or any other conceptual objects may be provided in a local registry to facilitate the local information exchange standard. For instance, the offender may have a group of associated attributes specific to offenders of interests to the law enforcement domain.

In any case, the local registry module 128 may be configured to manage the local registry. This may include adding new conceptual objects to the local registry, modifying the conceptual objects, removing the conceptual objects, deprecating the conceptual objects (e.g., marking the conceptual objects obsolete for future development by deactivating the conceptual objects), locating the conceptual objects, and/or any other management operations for managing the local registry. In some exemplary implementations, programming rules, such as an indexing scheme and/or other rules, may be preconfigured into the local registry module 128 at a configuration stage to facilitate the local registry management operations performed by local registry module 128. In some examples, interfaces for managing the local registry may be provided to facilitate the administrator, developer and/or any entity that is authorized to manage the local registry to initiate user actions that cause the local registry module 128 to execute the local management operations.

In some exemplary implementations, the local registry may be physically implemented through one or more electronic storages coupled to or included in the system 122, such as electronic storage 134 as illustrated. In some examples, the physical implementation of the local registry may include various types of indexing and/or clustering one or more files, records, tables, arrays, data structures, and/or any other data objects stored in the electronic storages.

The promotion request module 130 may be configured to obtain promotion requests for promoting conceptual objects in the local registry and/or for promoting product objects in the repository to the global registry. In some example, the promotion request module 130 may obtain the promotion requests as they are input by an administrator, developer, provider and/or any other entities related to the domain through a user interface. In some examples, the promotion request module 130 may be configured with programming rules to determine the promotion requests automatically, for example, based on the usage of the conceptual objects and/or product objects within the domain and/or across the domain. A promotion request obtained by the promotion request module 130 may include information indicating specific objects, including conceptual and/or product objects, in the local registry and/or repository to be promoted to the global registry, one or more developers or entities that created the objects in the local registry, textual descriptions of the objects, textual descriptions of reasons why the objects may be promoted to the global registry, and/or any other information facilitating promotion of objects in a local registry to the global registry.

In some examples where a promotion request for promoting a product object to the global registry, the promotion request module may be configured to generate one or more promotion requests for promoting conceptual objects included in the to-be-promoted product objects. For example, in a case where a product presenting a "Victim Information" product having an entity object of "Person" is requested to be promoted to the global registry, the promotion request module 130 may generate a promotion request to promote the "Person" entity to the global registry.

The object importation module 132 may be configured to import from external resources information indicating one or more conceptual objects to the local registry, and/or one or more product objects to the repository. Such external resources may include exchange artifacts facilitating specific information exchanges, XML files specifying one or more objects, spreadsheet files specifying schema or views of information, and/or any other external resources that may provide definitions of conceptual objects and/or project objects. For facilitating such importation, the object importation module 132 may analyze the external resources and determine which objects are provided by the external resources but not yet provided in the global registry, extract these objects from the external resources and/or creating these objects according to the definitions of the objects as indicated in the external resources, store these objects in the local registry and/or the repository such that they may be provided to the client computers in the domain, and/or perform any other operations for importing objects from the external resources to the local registry and/or repository.

As illustrated, the servers 102 and 122 may comprise electronic storage 108 and 134, and/or other components. The servers 102 and 122 may include communication lines, or ports to enable the exchange of information with a network and/or other computing platforms.

FIG. 1.A illustrates an example of a client computer 136 as shown in FIG. 1. By way of non-limiting example, the client computer 136 may include one or more of a desktop computer, a laptop computer, a handheld computer, a tablet computing platform, a NetBook, a Smartphone, a gaming console, and/or other client computing platforms. As illustrated, in this example, the client computer 136 employs a first processor 138 operatively connected to system memory 150 and a second processor 154 operatively connected to frame buffer 156. However, this is merely illustrative, as client computer 136 may be implemented with more or less processors than those shown. One or both of first processor 138 and/or second processor 154 may include a plurality of processing units operating in coordination in some other examples. As shown in this example, the first and second processors may be connected using a data bus or point to point connections, such the system bus 152, which transfers data between each structure of the client computer 136. Although not shown, the client computer may also include an input device, such as but not limited to, touch screen, motion sensor, mouse, trackball, touchpad, digitizing tablet, joystick, pointing stick, keypad, keyboard, camera, remote controller or any other suitable input device. The client computer 136 may also include a display, which is also not shown in this example. The display may include touch screen, liquid crystal display (LCD), light-emitting diode (LED) display, organic LED (OLED) displays, cathode ray tube (CRT) display, plasma display, projector screen, electroluminescent displays, vacuum fluorescent (VF) display, laser display, E-ink display or any other suitable displays, to name a few. The display may be configured to receive inputs from a user, for example a touchscreen. One of ordinary skill in the art will recognize other suitable structure, such as but not limited to, a storage device, a memory controller, an i/o subsystem and/or any other structure may also be included in the client computer 136.

In this example, the first processor 138 may include a host central unit (CPU) having multiple cores however any suitable processor may be employed including a DSP, APU, GPGPU or any other suitable processor or logical circuitry. The first processor 138 may be bi-directionally connected to other components of the client computer 136 via the system bus. The second processor 154 may include a graphics processing unit (GPU), which drives the display device via a display connector, such as analog display connectors, for example, composite video, S-Video, VGA, digital display connectors, for example, HDMI, mini-DVI, micro-DVI, wireless connectors or any other suitable connectors. It is understood that, in some other examples of client computer 136, the first processor 138 may be integrated with the second processor 154 to form a general processor.

In this example, as shown, the first processor 138 may be configured to execute an object module 140, an exchange object composition module 142, an exchange project composition module 144, an artifact generation module 146, an interface module 148 and/or any other modules.

The object module 140 may be configured to obtain standardized objects in a first set of registries facilitating global information exchange standards and to obtain conceptual objects in a second set of registries facilitating information exchange standards established for individual domains. The first set of registries may include global registries provided by servers such as one or more of the global registry server 102, via the global registry provision module 112. The global information exchange standards may provide developers of individual information exchanges logical models to specify the individual information exchanges without concerning physical implementations. As such, the global information exchange standards facilitated by the first set of registries may, for example, provide best practice and/or guidelines, e.g., by defining logical representations of elements, syntax, and/or structures for information exchange standards (e.g., such as NIEM), standardized process for conducting information exchanges based of business documents (e.g., the The Nationwide Suspicious Activity Reporting (SAR) Initiative (NSI)), international information standards (e.g., such as the ISO/IEC 11179 standard for representing metadata for an organization), standards established for exchanging information related to a general purpose (e.g., the ASC X12 standard for exchanging business transaction information, the HL 7 standard for exchanging information related to clinical patient care and the management, delivery, and evaluation of health care services, the IHE standard for exchanging information related to healthcare information, and/or any other standards established for exchanging information related to a general purpose), the and/or any other global information exchange standard. The standardized objects obtained by the object module 140 from the first set of registries may include components of reference models provided by those registries for facilitating global information exchange standards (e.g., predefined objects representing concepts within an information exchange or business context, such as what information describing the sender and/or receiver of an information exchange should entail, what conditions must be satisfied for the information exchanges to take place, what data requirements must be stratified by the information exchanges, and/or any predefined objects), components of data models provided by those registries that represent collective knowledge about how information should be represented in an exchange (e.g., object types, properties, relationships, metadata, semantics), objects that may be readily used to a start information exchange as they are commonly used by most of the information exchanges associated with those registries (e.g., best practices), and/or any other standardized objects provided by those registries. In some examples, such standardized objects may include conceptual objects and/or product objects provided by those registries for establishing corresponding global information exchange standards as described above.

The second set of registries may include local registries provided by servers such as one or more of the domain server 112 for establishing local information exchange standards for individual domains. The information exchange standards for the individual domains may reflect understandings how information in those domains may be represented. Such understandings may be specified by business rules, constraints, data requirements, business use semantics, and/or any other semantics. The object module 140 may be configured to obtain conceptual object from the second set of local registries that facilitate the local information exchange standards established for the individual domains. The conceptual objects obtained by the object module 140 from the second set registries may include conceptual objects representing business concepts of the corresponding domains, conceptual objects representing one or more local code value lists—i.e. local code values and literals corresponding to objects provided by the first set of registries, conceptual objects representing reusable components in individual information exchanges, and/or any other conceptual objects.

In any case, for obtaining the objects, the object module 140 may be configured with semantics such as identities of one or more servers providing the first and set of registries, e.g., such as the servers 102 and 122 as illustrated in FIG. 1, network protocols for interacting with these servers, interface information for accessing the first set of registries and/or second set of registries, and/or any other semantics for obtaining the standardized objects from the global registries and the local registries.

The exchange object composition module 142 may be configured to enable users to compose exchange objects corresponding to data elements of individual information exchanges by using the standardized objects and/or the conceptual objects obtained by the object module 140. Such exchange objects may correspond to data elements of exchange artifacts, which may be any tangible and potentially reusable documentations and/or output pertaining to any existing or potential information exchange. As such, the exchange objects may include, for example, but not limited to, exchange metadata that specify description, administration, legal requirements, technical functionality, use and usage, and/or preservation of the information being exchanged, exchange payload that specify data content of the information being exchanged, one or more services being facilitated by the information exchanges, and/or any other exchange objects that may be used to specify individual information exchanges.

The exchange object composition module 142 may enable users to compose exchanged objects by facilitating the users to include objects obtained by the object module 140. In some exemplary implementations, an exchange object composition may be enabled by allowing users to specify information structure by adding objects to a directory tree representing the exchange object, to specify required information elements and/or optional requirements for the exchange object, to specify one or more conditions precedent to the exchange object, to specify default value lists for the exchange objects, a privacy level for the exchange object (e.g., for setting an authorization level required to see or use the information), to specify a security level of the exchange object (e.g., for setting a credential level required to see or use information contained in the object), maximum and/or minimum data length, and/or to specify any other aspects that may be associated with the exchange object.

The project composition module 144 may be configured to enable the users to compose exchange projects that specify individual information exchanges by using user composed exchange objects. An exchange project may be composed by a user to include a collection of one or more information exchanges for a specific purpose and may be implemented by exchange servers (not illustrated in this example) to carry out the one or more information exchanges. As such, the exchange project, in some examples, may comprise business requirements, process, and/or events governing the information exchanges included in the exchange project. In some examples, the exchange project may include metadata content (e.g., such as metadata about the project, processes and/exchange use cases), exchange payload content used by an exchange use case (e.g., a product object), and/or any other components that may be included in an exchange project.

By way of a non-limiting example, an exchange project composed by a user for exchanging information of citations made by a group of law enforcement agencies may include information describing a provider of the citation information (e.g., a county court), one or more receivers or consumers of the citation information exchange (e.g., the county attorney office, county sheriff office and so on), one or more documents specifying criminal disposition use cases, exchange payload content (e.g., charge data collection), sponsor, endorser, developer, and/or any other entities of the citation information exchange, and/or any other information that may be included in an exchange project for implementing the actual information exchanges.

In any case, the project composition module 144 may enable users to compose exchange projects by using the user composed exchange objects, which may include metadata, documentation, product, and/or any other exchange objects. In some examples, such enablement may include enabling the users to include metadata objects specifying metadata information describing the exchange project (e.g., such as, business name, description, development schedule, disclosure category, and/or any other metadata information), an object or objects indicating contact information for, e.g., owner, author, sponsor, endorser, and/or any other entities related to the information exchange project, an object or objects indicating identity information of the provider and/or consumer(s) of the information being exchanged as specified by the information exchange project, one or more product objects representing exchange payload (e.g., one or more product objects), one or more document objects indicating documents to be included in the exchange project, and/or any other objects that may be included in the exchange project.

The artifact generation module 146 may be configured to generate exchange artifacts representing documentations and/or outputs of the individual information exchanges based on the user composed exchange projects. The generated exchange artifacts may conform to one or more exchange standards, such as the National Information Exchange Model (NIEM), Health Level Seven (HL7), Accredited Standards Committee X12 (ASC X12) and/or any exchange standard. In some examples, one or more artifacts may be generated based on a user composed exchange project and make up an information package documentation (IEPD). In those examples, as such, the artifacts generated by the artifact generation module 146 may include, but not limited to, IEPD metadata instance, product reference schema, entity digest and extension schema, subset schemas, IEPD Catalog, mapping sheet, want list, and/or any other exchange artifacts.

In any case, for generating such exchange artifacts conforming to the one or more exchange objects, the artifact generation module 146 may obtain information such as set type information for the exchange artifacts to be generated based on the user composed exchange project (e.g., NIEM, HL7 ASC-X12, and so on), a XML standard for generating the artifacts (e.g., NIEM 2.1), schema style (e.g., LEXS) a source or sources from which the underlying exchange project may be obtained, a name to identify the generated exchange artifacts, and any other information for generating the exchange artifacts. Programming rules, specifications, and/or semantics may be configured with the artifact generation module 146, which may include semantics for parsing the underlying exchange project, semantics for generating the exchange artifacts using the XML standard and exchange standard (e.g., via the set type specification) specified by the users, semantics for packaging the generated exchange artifacts based on the exchange standards specified by the users.

The interface module 148 may be configured to generate graphical user interfaces enabling the users to perform actions to manage the conceptual objects in the local registries, to compose exchange objects, to compose exchange projects, to generate exchange artifacts, and/or to perform any other user actions. The information generated by the interface module 148 may cause electronic displays coupled to the client computers, e.g., such as the client computers 136 as illustrated, to present a graphical user interface for managing the conceptual objects in the local registries, composing exchange objects, composing exchange projects, generating exchange artifacts, and/or any other user actions. Such user actions may be enabled by controls provided by the graphical user interface, such as, but not limited to, navigation trees, selection boxes, text input boxes, radio buttons, and/or any other field controls. The information generated by the interface module 148 may include HTML code, view information, information indicating graphics for presentation on the client computers, and/or any other information.

Referring back to FIG. 1, external resources 120 may include sources, hosts, and providers of information exchanges outside of servers 102 and 122, external entities participating with severs 102 and/or 104, and/or other resources. In some implementations, some or all of the functionality attributed herein to external resources 120 may be provided by resources included in servers 102 and 122.

Electronic storages 118 and 134 may comprise non-transitory storage media that electronically stores information. The electronic storage media of Electronic storage 118 and 134 may include one or both of system storage that is provided integrally (i.e., substantially non-removable) with servers 102 and 122 and/or removable storage that is removably connectable to servers 102 and 122 via, for example, a port (e.g., a USB port, a firewire port, etc.) or a drive (e.g., a disk drive, etc.). Electronic storages 118 and 134 may include one or more of optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. Electronic storages 118 and 134 may include one or more virtual storage resources (e.g., cloud storage, a virtual private network, and/or other virtual storage resources). Electronic storages 118 and 134 may store software algorithms, information determined by processors 104 and 124, information received from servers 102 and 104, information received from client computers 136, and/or other information that enables servers 102 and 122 to function as described herein.

Processors 104, 124, 138 are configured to provide information processing capabilities in servers 102, 122 and client computer 136 respectively. As such, Processors 104, 124, 138 may include one or more of a digital processor, an analog processor, a digital circuit designed to process information, an analog circuit designed to process information, a state machine, and/or other mechanisms for electronically processing information. Although processors 104, 124, 138 are shown in FIG. 1 and FIG. 1A as single entities, this is for illustrative purposes only. In some implementations, Processors 104, 124, 138 may include a plurality of processing units. These processing units may be physically located within the same device, or Processors 104, 124, 138 may represent processing functionality of a plurality of devices operating in coordination. The processors 104, 124, 138 may be configured to execute modules 106, 108, 110, 112, 114, 116, 126, 128, 130, 132, 140, 142, 144, 146, 148. Processors 104, 124 and 138 may be configured to execute modules 106, 108, 110, 112, 114, 116, 126, 128, 130, 132, 140, 142, 144, 146, 148 by software; hardware; firmware; some combination of software, hardware, and/or firmware; and/or other mechanisms for configuring processing capabilities on processors 104, 124, and 138. As used herein, the term "module" may refer to any component or set of components that perform the functionality attributed to the module. This may include one or more physical processors during execution of processor readable instructions, the processor readable instructions, circuitry, hardware, storage media, or any other components.

It should be appreciated that although modules 106, 108, 110, 112, 114, 116, 126, 128, 130, 132, 140, 142, 144, 146, 148 are illustrated in FIG. 1 and FIG. 1A as being implemented within a single processing unit, in implementations in which processors 102, 124 and 138 includes multiple processing units, one or more of modules 106, 108, 110, 112, 114, 116, 126, 128, 130, 132, 140, 142, 144, 146, 148 may be implemented remotely from the other modules. The description of the functionality provided by the different modules 106, 108, 110, 112, 114, 116, 126, 128, 130, 132, 140, 142, 144, 146, 148 described herein is for illustrative purposes, and is not intended to be limiting, as any of modules 106, 108, 110, 112, 114, 116, 126, 128, 130, 132, 140, 142, 144, 146, 148 may provide more or less functionality than is described. For example, one or more of modules 106, 108, 110, 112, 114, 116, 126, 128, 130, 132, 140, 142, 144, 146, 148 may be eliminated, and some or all of its functionality may be provided by other ones of modules 106, 108, 110, 112, 114, 116, 126, 128, 130, 132, 140, 142, 144, 146, 148. As another example, processors 104, 124 and 138 may be configured to execute one or more additional modules that may perform some or all of the functionality attributed below to one of modules 106, 108, 110, 112, 114, 116, 126, 128, 130, 132, 140, 142, 144, 146, 148. As still another example, some or all of the modules of 106, 108, 110, 112, 114, 116, 126, 128, 130, 132, 140, 142, 144, 146, 148 may be executed on different processors of 104, 124 and 138 from those shown in FIGS. 1 and 1A: for instance, some or all of the modules of 140, 142, 144, 146, 148 may be executed on processor 124 instead of processor 138.

Figure 2:
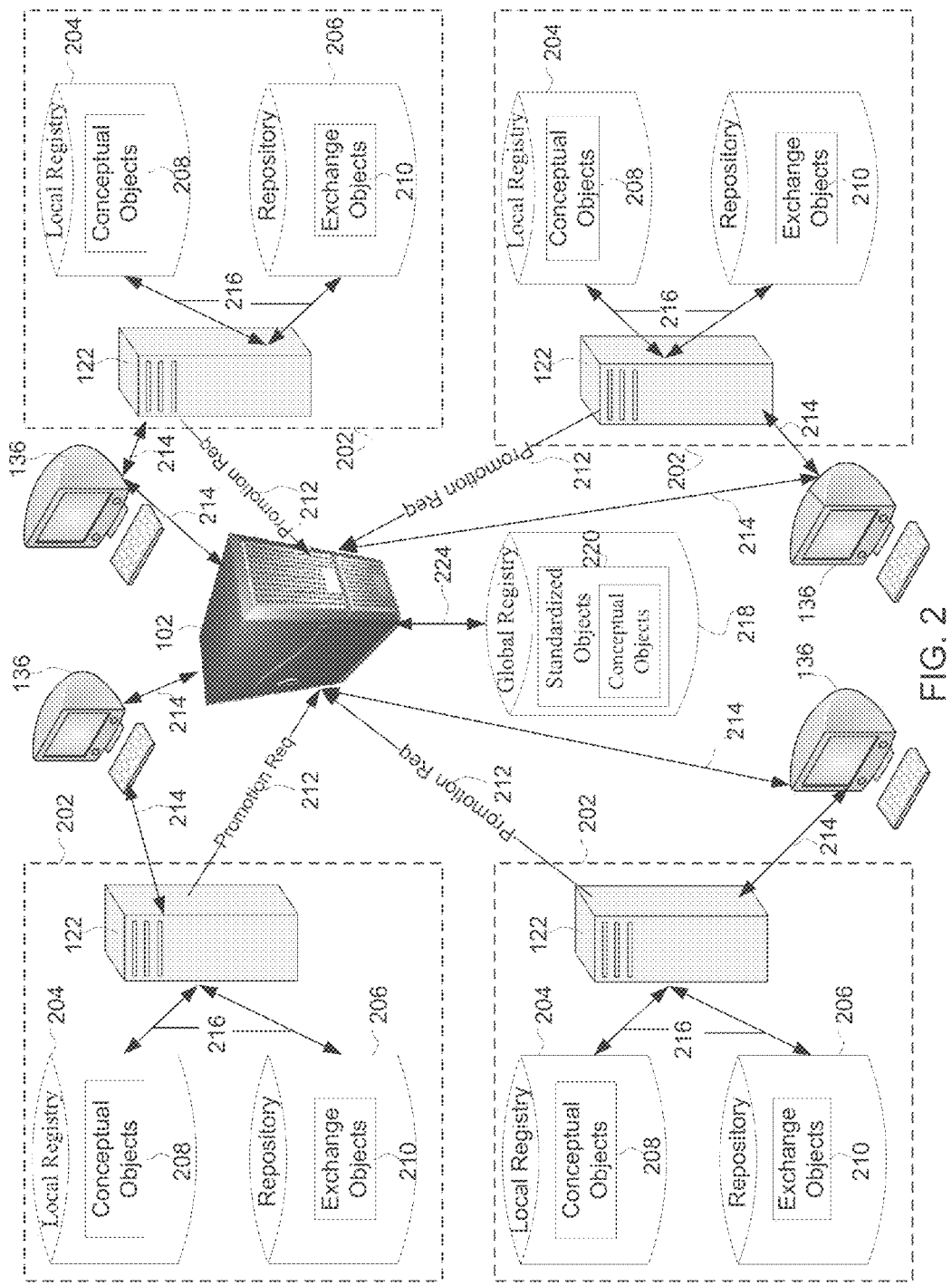
FIG. 2 illustrates one example of an integrated environment having multiple domains for developing information exchanges.

FIG. 2 illustrates one example of an integrated environment having multiple domains for developing information exchanges. It will be described with references to FIGS. 1 and 1A. Shown in this example are a global registry server 102 operatively connected to domain servers 122 associated with individual domains 202 and client computers 136 operatively connected to the global registry server 102 and the domain servers 136. It is understood that although four domains 202 and four client computers 136 are shown in this example, this is merely illustrative. In some other examples, more or less domain servers 202 may be operatively connected to the global registry server 102; and multiple client computers may be operatively connected to a domain server 202 and the global registry server 102.

As shown in this example, the global registry server 102 may be operatively connected to a global registry 218, which may be physically implemented on one or more electronic storages coupled to or included in the global registry server 102, such as the electronic storage 118 as shown in FIG. 1. As illustrated in this example, the global registry 218 may provide standardized objects 220. The standardized objects 220 in the global registry 218 may be determined by an authenticator, an administrator, a provider, a developer and/or any other entities for facilitating a global information exchange standard. The global information exchange standard facilitated by global registry 218 may provide best practice and/or guidelines, e.g., by defining elements, syntax, and/or structures for information exchanges (e.g., such as NIEM), standardized process for conducting information exchanges (e.g., the The Nationwide Suspicious Activity Reporting (SAR) Initiative (NSI)), international information standards (e.g., such as the ISO/IEC 11179 standard for representing metadata for an organization), standards established for exchanging information related to a general purpose (e.g., the ASC X12 standard for exchanging business transaction information, the HL 7 standard for exchanging information related to clinical patient care and the management, delivery, and evaluation of health care services, the IHE standard for exchanging information related to healthcare information, and/or any other standards established for exchanging information related to a general purpose), the and/or any other global information exchange standard. The standardized objects 220 may include components of reference models (e.g., based on the global information standard, components of data models (e.g., object types, properties, relationships, metadata, semantics) based on the global information exchange standard, reusable objects that may be readily used for developing a new information exchange, and/or any other standardized objects. In this example, as shown, the standardized objects 220 include conceptual objects, which may correspond to data models that represent cross-domain views of how information may be represented and/or exchanged as described above. Examples of such data models may include entity-relationship, network structure, object-oriented, and/or any other data models.

In this example, the local registry 204 provides conceptual objects 208 developed for establishing local information exchange standard of the domain 202, which may include organizations, agencies, departments, subsidiaries, local governments, and/or any other logical groups characterized by specific functions, features, responsibilities, and/or line of businesses. The conceptual objects 208 may correspond to data elements of the local information exchange standard as determined by an administrator, developer, provider and/or any other entities related to establishing a local information standard of the domain 202. The conceptual objects 208 may include objects representing real-world concepts, business concepts, business rules, business use semantics and/or any other concepts related to an understanding of how information should be represented in the domain 202.

In this example, the repository 206 stores exchange objects 210. The exchange objects 210 may correspond to data elements of exchange artifacts. The data elements of exchange artifacts may be any tangible and potentially reusable documentations, output pertaining to any existing or potential information exchange, and/or other elements. As such, the exchange objects 210 may include, for example, but not limited to, exchange metadata that specify description, administration, legal requirements, technical functionality, use and usage, and/or preservation of the information being exchanged, exchange payload that specify data content of the information being exchanged, one or more services being facilitated by the information exchanges and/or any other exchange objects that may be used to specify individual information exchanges.

The local registry 204 and the repository 206 may be operatively coupled to the domain server 122 via any suitable wired or wireless connections, such as the links 216 as illustrated.

Via the links 216, the domain server 122 may manage the local registry and the repository by, for example, by adding, deleting, deprecating, locating, storing, retrieving, importing to, exporting from the objects in the local registry 204 and the repository 206, and/or perform any other operations to manage the local registry 204 and the repository 206. It is understood although the local registry 204 and the repository 206 are coupled to a single domain server 122 in the domain 202 in this example, this is merely illustrative. In some other examples, the local registry 204 and the repository 206 may be coupled to separate servers, e.g., such as a local registry server and a repository server, in the domain 200. It is also understood that in some examples the local registry 204 and the repository 206 may be integrated in one storage that provide the objects in local registry 204 and the repository 206 as described here-in.

In any case, in this example, as shown, the domain server 122 may be configured to generate promotion requests for promoting the objects 208 and 210 in the local registry 204 and repository 206 respectively to the global registry 218 via the global registry server 102. The promotion requests may be communicated to the global registry server 102 via any suitable wired or wireless links such as the links 212 as shown. The global registry server 212 may be configured to receive the promotion requests from the domain server 122, e.g., via the promotion receipt module 108 as described in FIG. 1. The objects being requested by the promotion requests 212 may be promoted to the global registry 218 in response to obtaining reviewing information indicating approvals of the promotion requests, e.g., via the promotion review module 110 as described in the FIG. 1.

Also shown in this example are client computers 136 operatively connected to the domain servers 122 and the global registry server 214 via links 214, which may be any suitable wired or wireless connections in accordance with a client/server architecture as described in FIG. 1. Via the links 214, the client computer 136 may obtain standardized objects 220, conceptual objects 208 and/or exchange objects 210 for developing information exchange based on the global information exchange standard facilitated by the global registry 218 and/or the local information exchange standards facilitated by the local registries 204 and repositories 206. For obtaining these objects the client computers 136 may be configured to execute object modules the same as or similar the object module 140 described in FIG. 1.

Figure 2A:
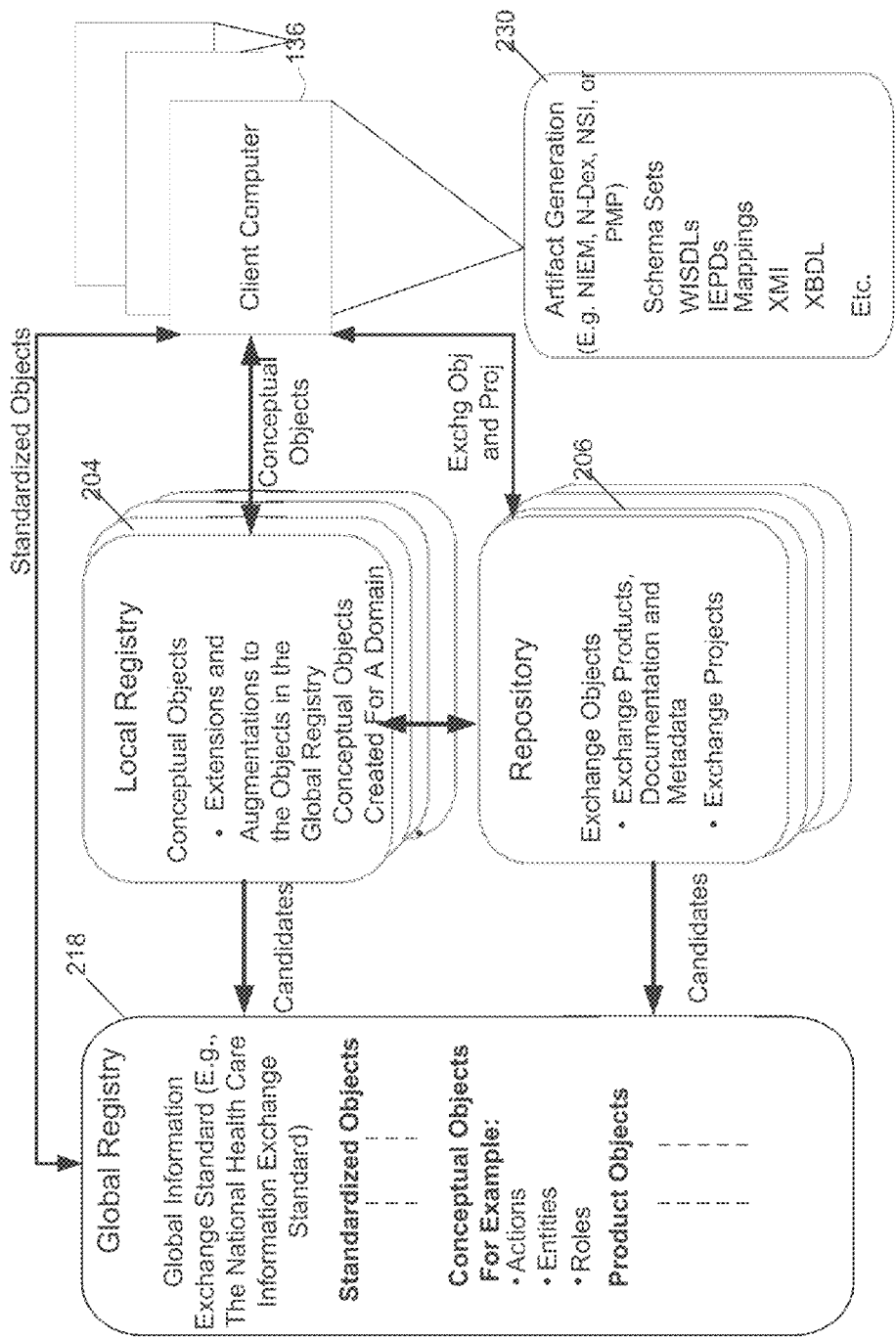
FIG. 2A illustrates an example of generating exchange artifacts in the integrated environment for developing information exchanges as shown in FIG. 2.

FIG. 2A illustrates an example of generating exchange artifacts in the integrated environment for developing information exchanges as shown in FIG. 2. It will be described with references to FIGS. 1-2. As shown in this example, the client computers 136 may obtain standardized objects from the global registry 218 and conceptual objects from the local registries 204. The obtained standardized objects and/or the conceptual objects may be used by the client computers 136 to compose exchange objects stored in the repositories 206. Such user composed exchange objects may be used by the client computers 136 to compose exchange projects stored in the repositories 206. The user composed exchange projects may be used by the client computers 136 to generate exchange artifacts 230. As illustrated, the generated exchange artifacts by the client computers 136 may conform to exchange standards such as, but not limited to, NIEM, HL7 ASC X12, and/or any other exchange standards. As also shown, the objects in the local registries 204 and in the repositories 206 may be promoted, for example as requested by the promotion requests shown in FIG. 2, as candidates to be provided in the global registry 218.

Figure 3:
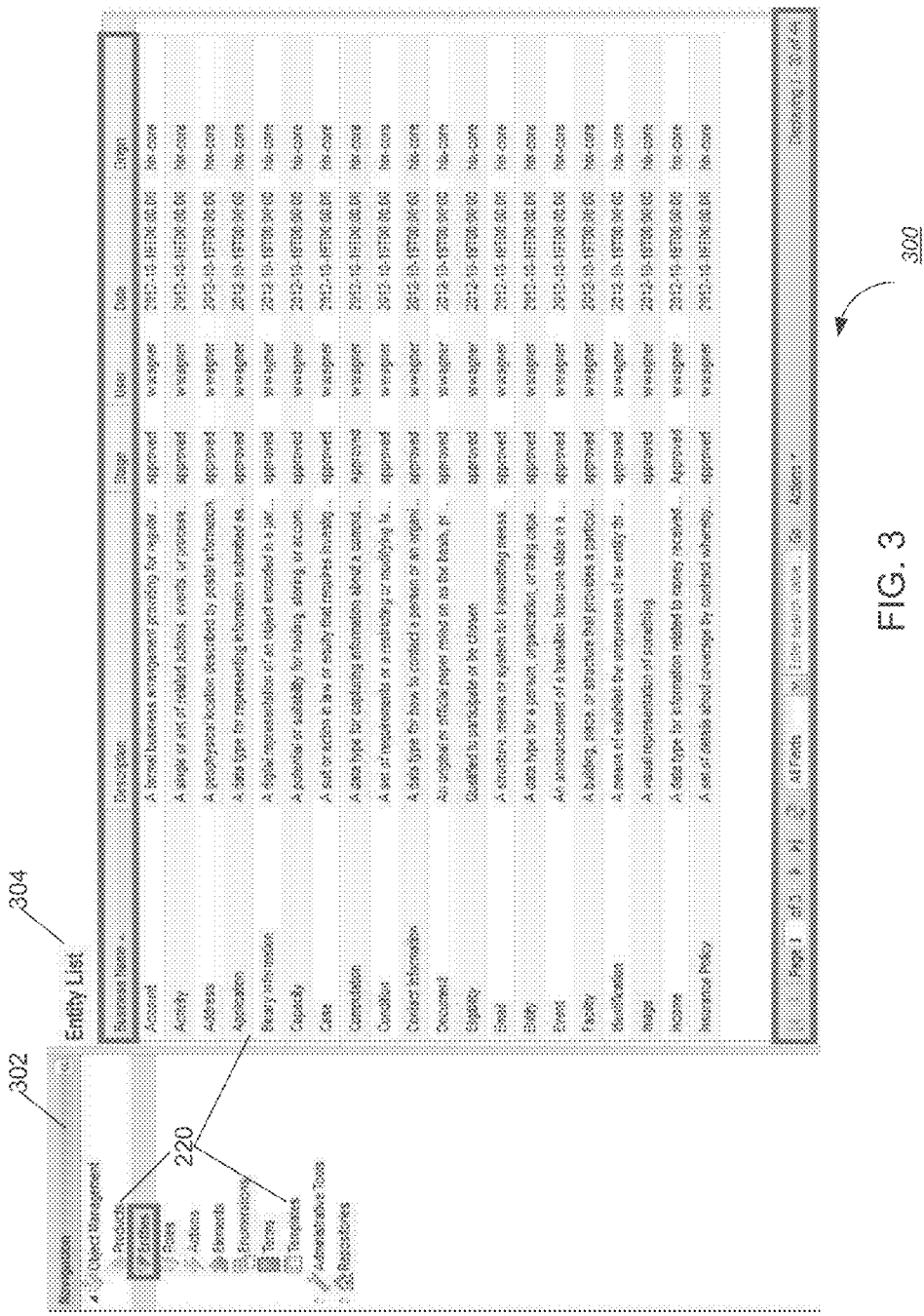
FIG. 3 illustrates an example of providing a graphical user interface for enabling user actions to manage the global registry as shown in FIG. 2.

FIG. 3 illustrates an example of providing a graphical user interface 300 for enabling user actions to manage the global registry 218 as shown in FIG. 2. It will be described with references to FIG. 2. As shown, the graphical user interface 300 may provide a navigation panel 302 for users to navigate through standardized objects in the global registry 218. In this example, "entity" is selected in the navigation panel, and a list of entity objects in the global registry 218 is listed in a list panel 304 provided by the graphical user interface 300 as shown.

Figure 3A:
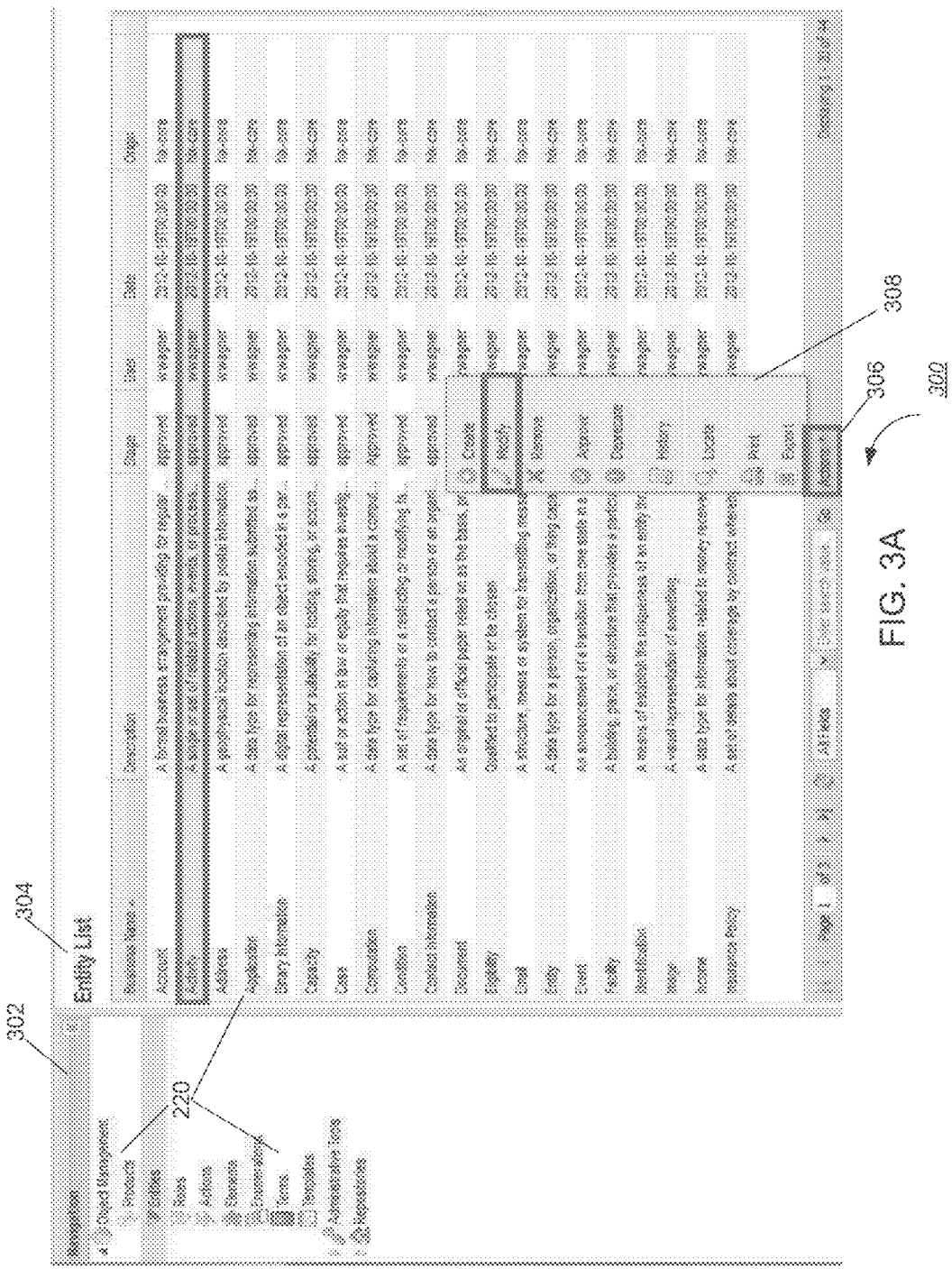
FIG. 3A illustrates an example of enabling users to manage objects in the global registry through the graphical user interface shown in FIG. 3.

FIG. 3A illustrates an example of enabling users to manage objects in the global registry through the graphical user interface shown in FIG. 3. As shown, an action menu 308 may be displayed by the graphical user interface 300 responsive to user selecting a control 306 indicating that actions may be performed on the standardized objects in the global registry 218. As shown, a list of management operations is enabled by the action menu 308. In this example, the action of modifying an "Activity" object is initiated.

Figure 3B:
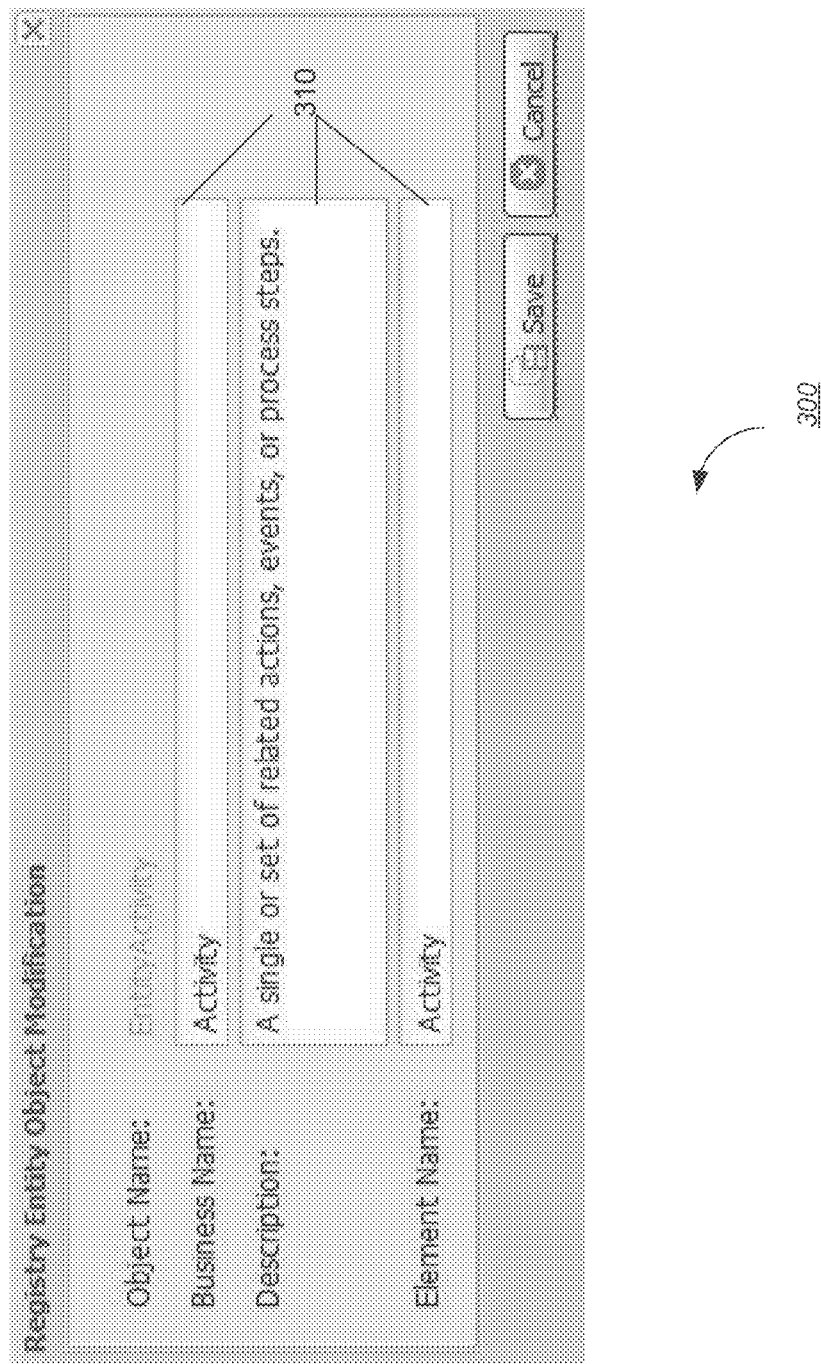
FIG. 3B illustrates one example of enabling users to modify object in the global registry through the graphical user interface shown in FIG. 3.

FIG. 3B illustrates one example of enabling users to modify object in the global registry through the graphical user interface 300. As illustrated, an input panel 308 may be provided by the user graphical interface 300 in response to user initiating an action to modify the "Activity" object as illustrated in FIG. 3A. As shown, the input panel may provide input boxes 310 for modifying the object name, changing the description of the object, changing the element name, and/or any other user actions.

Figure 3C:
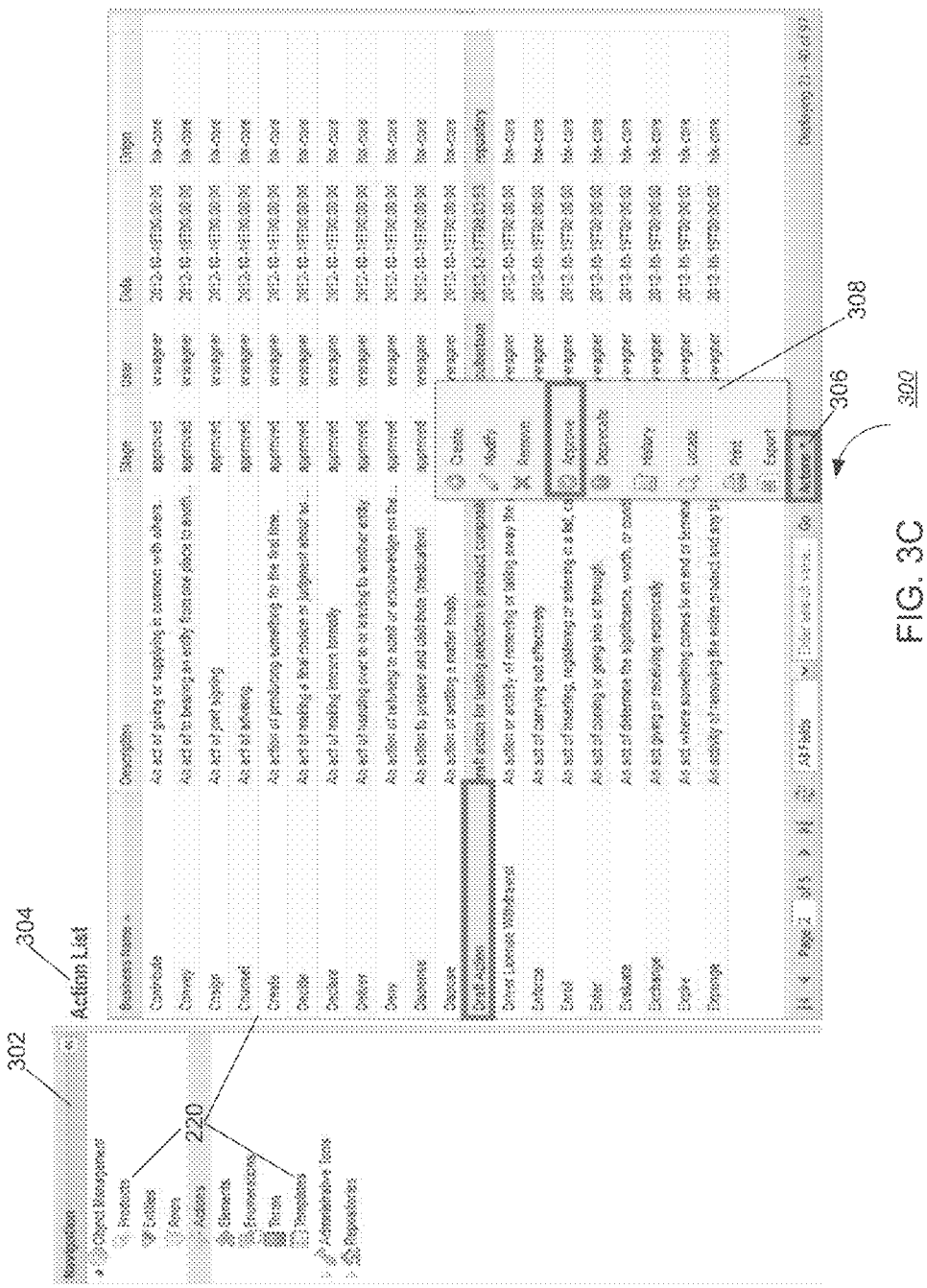
FIG. 3C illustrates one example of enabling users to approve candidate objects through the graphical user interface shown in FIG. 3.
Figure 3D:
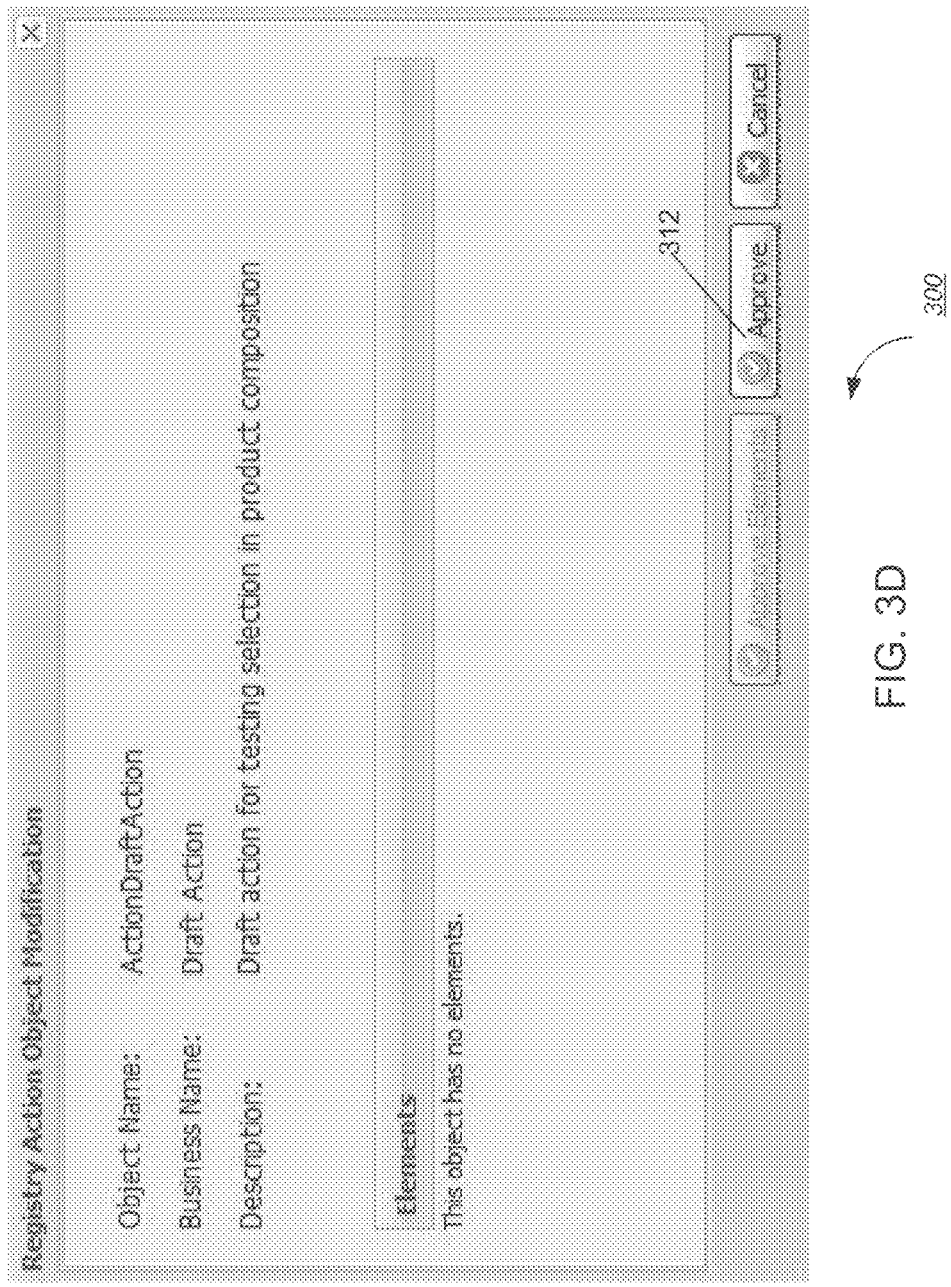
FIG. 3D illustrates that an "approve" button may be provided by the graphical interface shown in FIG. 3 in response to the user action to initiate an approval of the candidate object.

FIG. 3C illustrates one example of enabling users to approve candidate objects through the graphical user interface shown in FIG. 3. In this example, as shown, an action to approve a "Draft Action" candidate object may be initiated. The "Draft Action" candidate object may be requested to be promoted to the global registry 218 by a promotion request generated by a domain, such as the domain 202 as shown in FIG. 2. FIG. 3D illustrates that an "approve" button 312 may be provided by the graphical interface 300 in response to the user action to initiate an approval of the candidate object.

Figure 4:
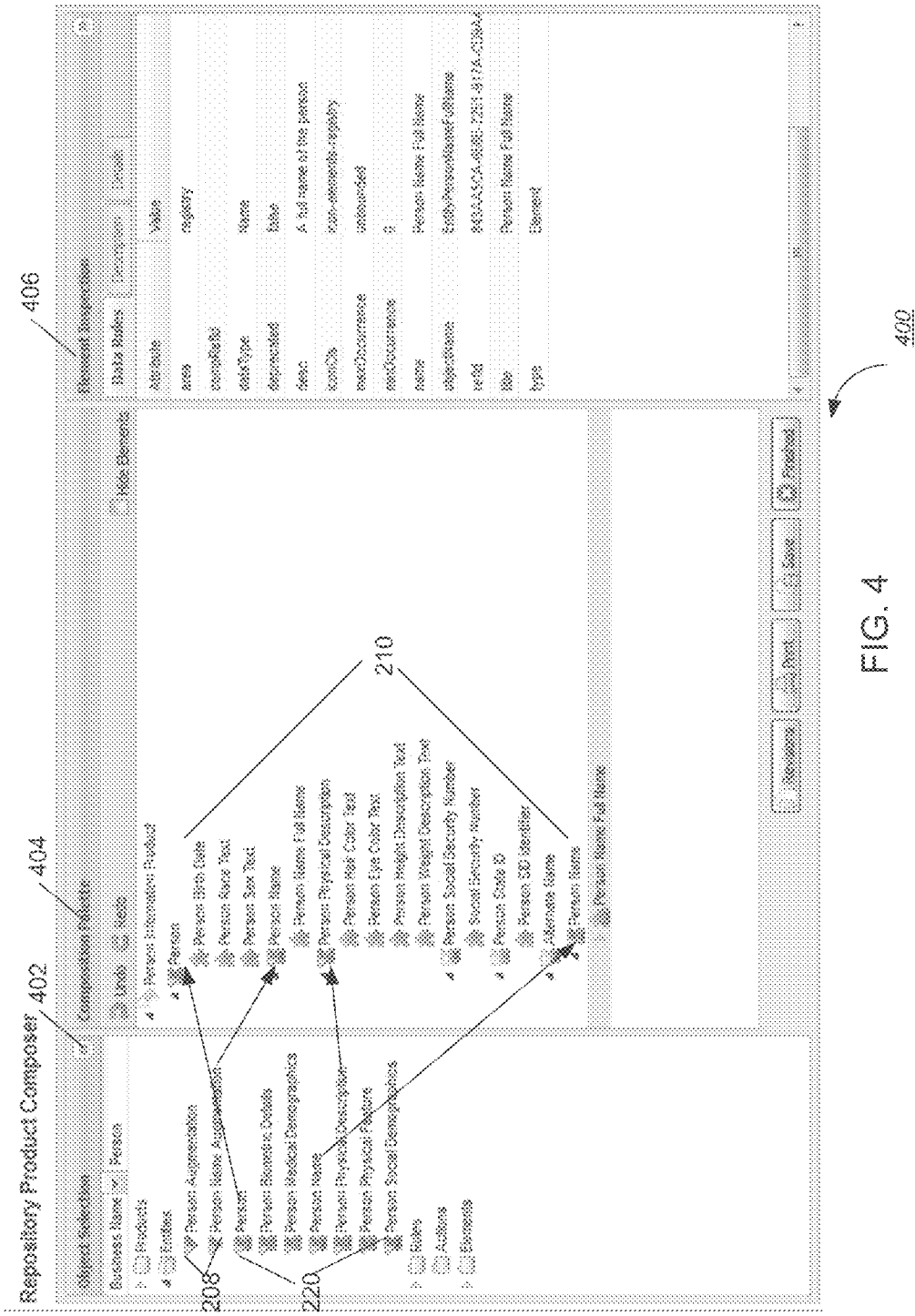
FIG. 4 illustrates an exemplary graphical user interface for enabling users to compose product objects.

FIG. 4 illustrates a graphical user interface 400 for enabling users to compose an exchange product. As shown in this example, the graphical user interface 400 comprises an object selection panel 402, a composition palette 404, an element inspection panel 406, and/or any other components. As shown, the composition palette 404 enables users to compose an exchange product "Person" In this example by using the standardized objects 220 and conceptual objects 208 listed in the object selection panel. The conceptual objects 208—i.e., the "Personal Augmentation" object and the "Person Name Augmentation" object may be provided by a local registry, such as the local registry 204 as shown in FIG. 2. The standardized objects 220—i.e., the person object, person biometric details, person medical demographics, person name, person physical description, person physical feather, and persona social security demographics object may be provided by a global registry, e.g., such as the global registry 218 shown in FIG. 2. As illustrated, the graphical user interface 400 enables the users to include the conceptual objects 208 from the local registry and the standardized objects 220 from the global registry in a "Person" exchange product, which may be used to specify exchange payload.

Figure 4A:
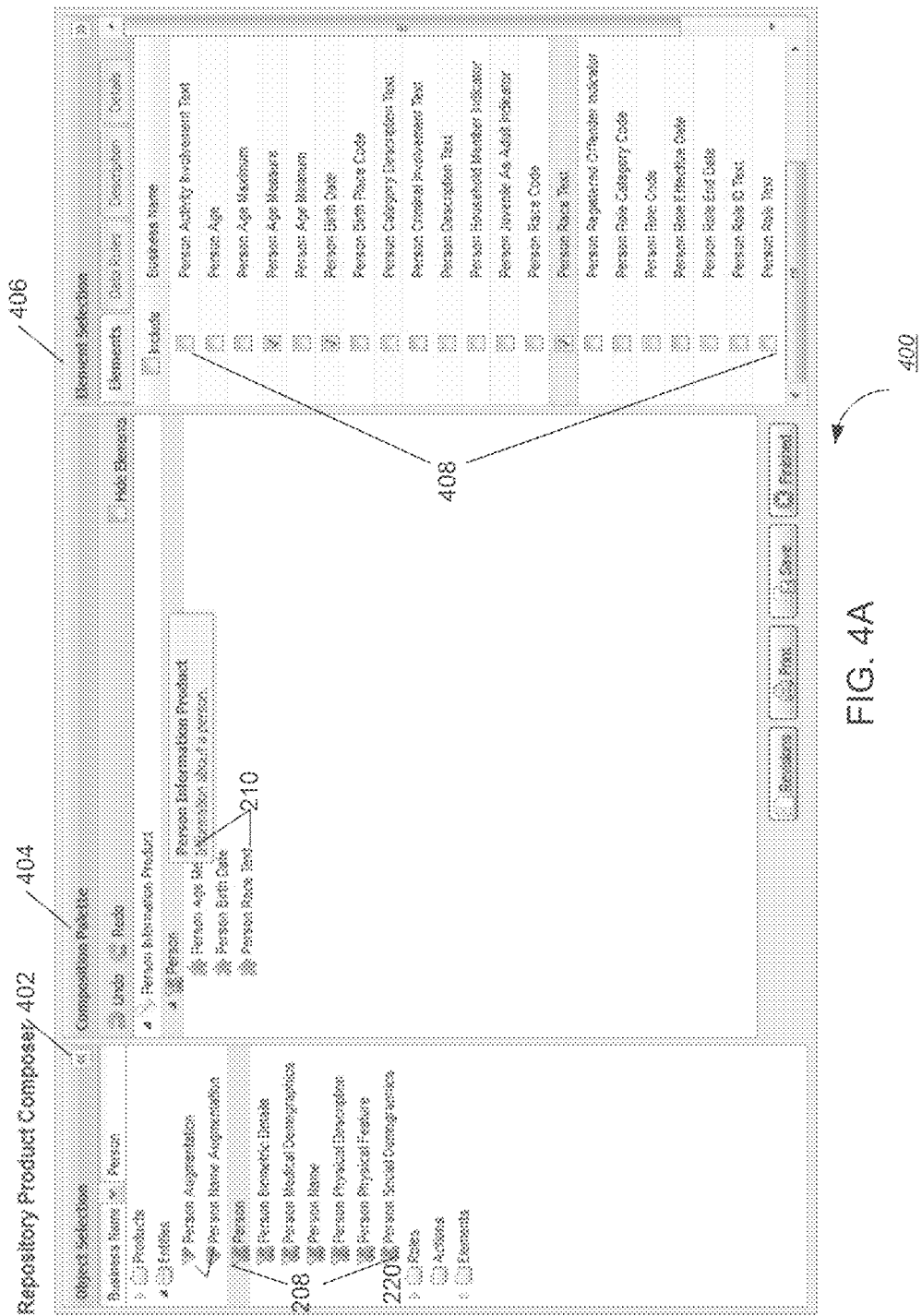
FIG. 4A illustrates an example of enabling users to select elements to be included in the product objects illustrated in FIG. 4.

FIG. 4A illustrates an example of enable user to select elements to be included in the exchange products illustrated in FIG. 4. As shown, the element selection panel 406 presents all the elements 408 contained in an object 220 or object 208 as predetermined and provided in the global registry or local registry. As shown, selection boxes may be provided by the user graphical interface 400 next to the elements 408 such that the user may select or deselect elements to be included in the object 208 or 220 for composing the exchange product.

Figure 5:
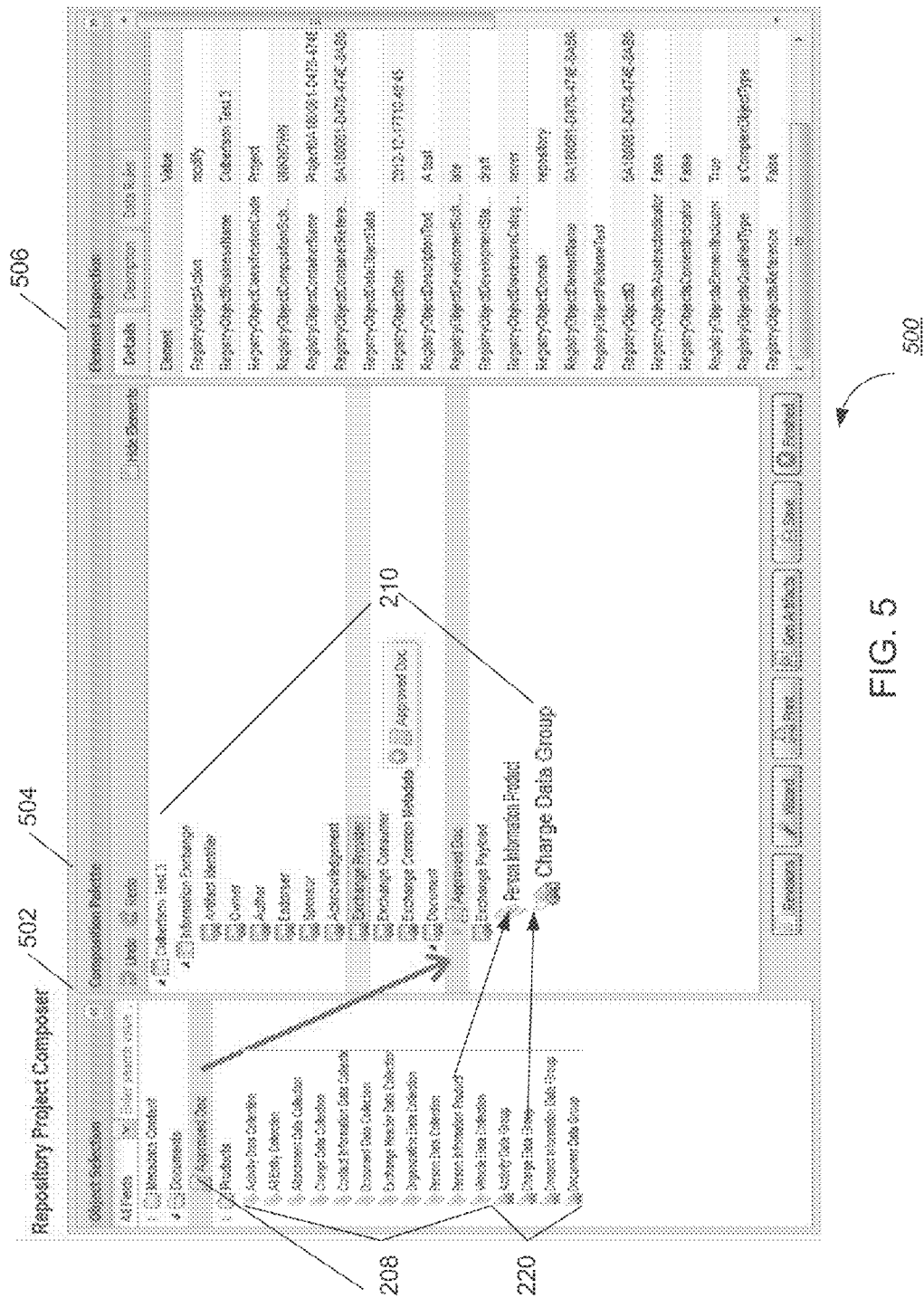
FIG. 5 illustrates an exemplary graphical user interface for enabling users to compose exchange projects.
Figure 5A:
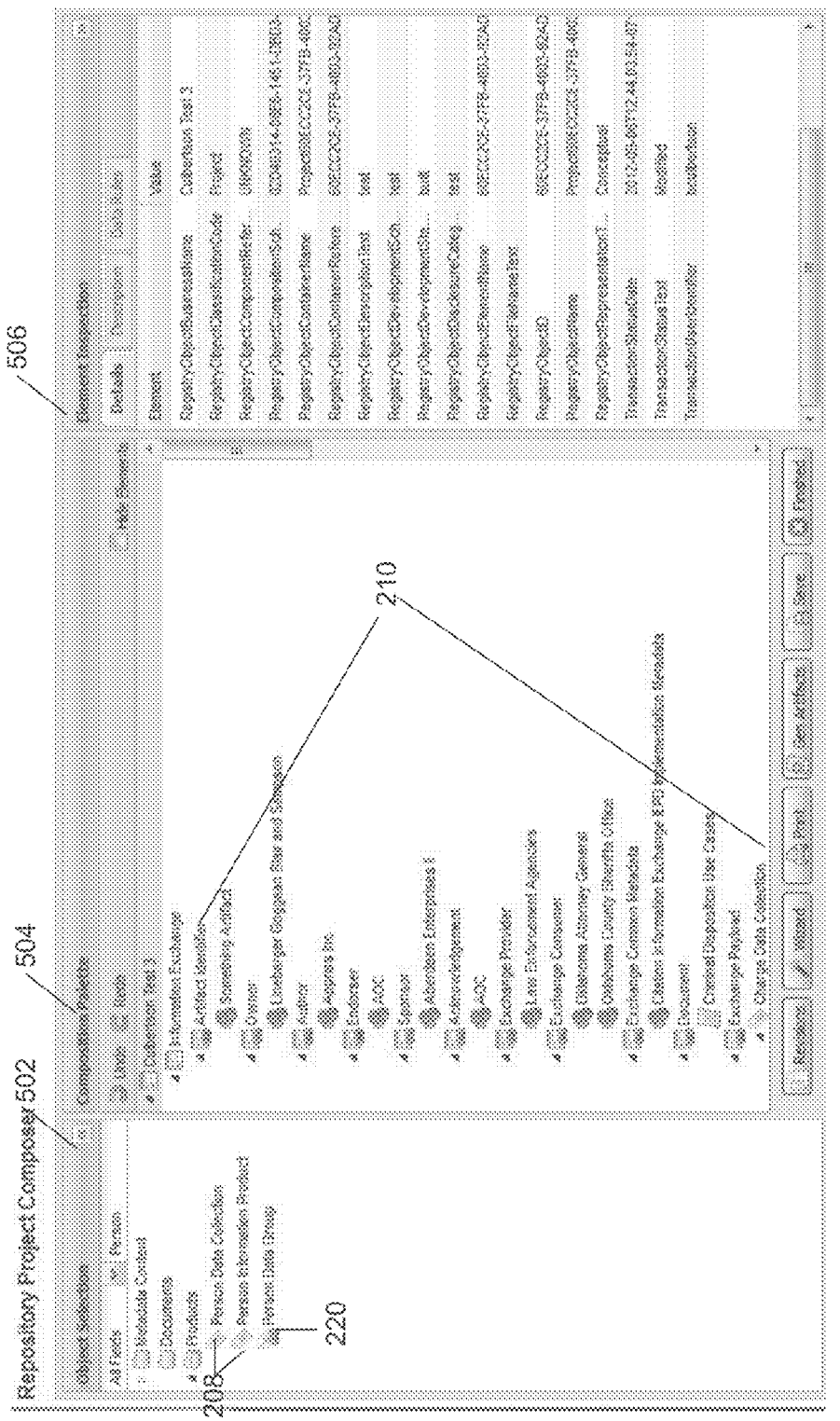
FIG. 5A illustrates an example of an exchange project composed through the graphical user interface shown in FIG. 5.

FIG. 5 illustrates an exemplary graphical user interface 500 for enabling users to compose exchange projects. As shown, the graphical user interface 500 may comprise an object selection panel 502, a composition palette 504, an element inspection panel 506, and/or any other components. Through the composition palette 504, users may compose an exchange project 210 by adding metadata content, documents, product objects, and/or any other content to the exchange project 210. As illustrated, the document—i.e., the "approve doc" and the product objects may be provided by a local registry, e.g., such as the local registry 204 as shown in FIG. 2. As also illustrated, product objects 220 provided by a global registry, such as the global registry 218, may be used by the user for composing the exchange project. In this example, as shown, a "person information product" obtained from a local registry, and a "charge data group" obtained from the global registry are added to the exchange 210. FIG. 5A illustrates an example of an exchange project composed through the graphical user interface shown in FIG. 5.

Figure 6:
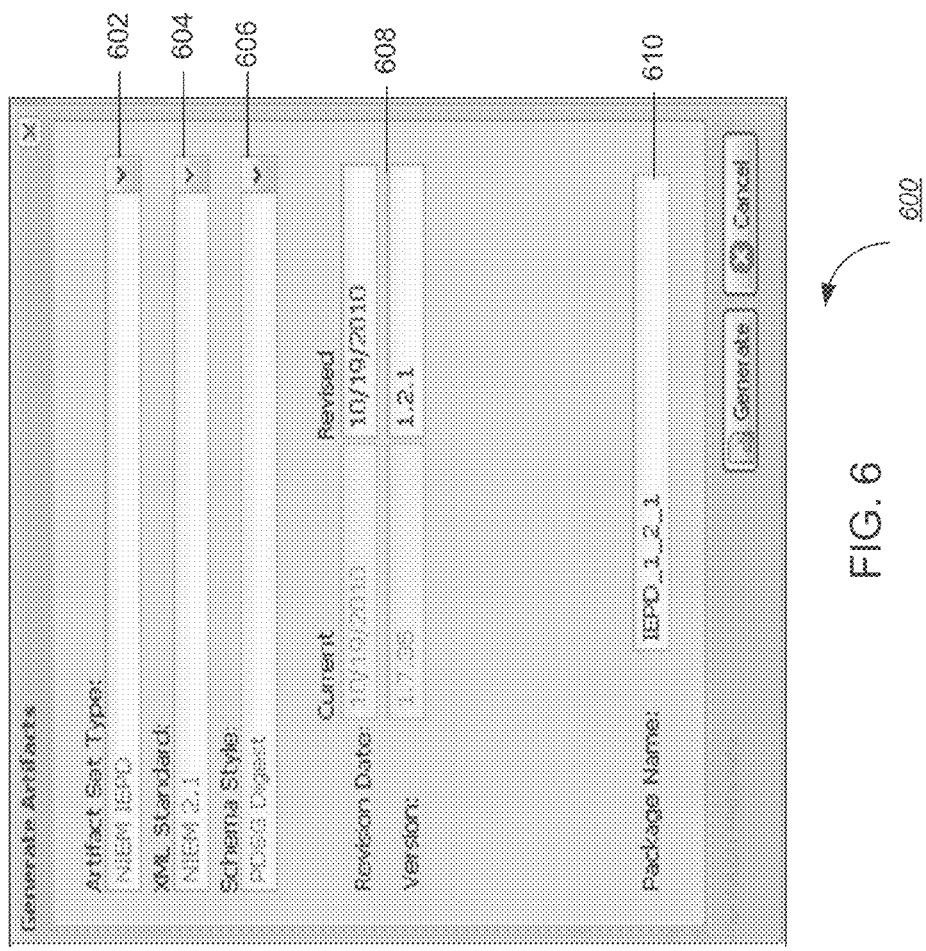
FIG. 6 illustrates an example of providing a graphical user interface enabling users to generate exchange artifacts conforming to multiple exchange standards.

FIG. 6 illustrates an example of providing a graphical user interface 600 for enabling users to generate exchange artifacts conforming to multiple exchange standards. As shown, the graphic user interface comprises an artifact set type selection menu 602, a XML standard selection menu 604, a schema style selection menu 606, revision data and version data input boxes 608, and a package name input box 610. Through artifact set type selection menu 602, a user may select an exchange standard to which the exchange artifact conforms to. As shown in this example, NIEM IEPD. Other options provided by the set type selection menu 602 may include NIEM, HL7, ASC X12, and/or any other exchange standards. Through the XML standard selection menu 604, the user may select an XML standard based on which the exchange artifacts may be generated.

Figure 7:
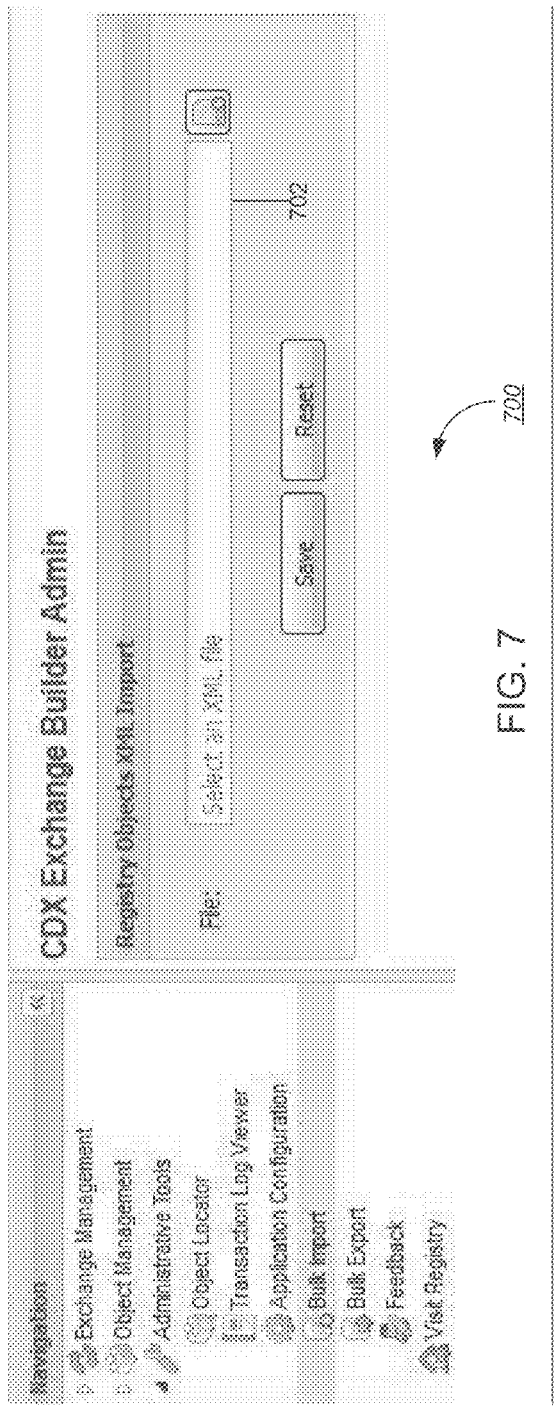
FIG. 7 illustrates an example of providing a graphical interface to enable users to import objects into a registry or repository from an external resource.

FIG. 7 illustrates an example of providing a graphical interface 700 to enable users to import objects into a registry or repository from an external resource. As shown in this example, a file selection menu 702 may be provided through the graphical interface 700. An XML file, a spread sheet, a database table and/or any other files or sources external to a registry or repository may be selected using the file selection menu 702. In response to user selection of a file or source from which objects may be imported to the registry or repository, a command to import such may be generated.

Figure 8:
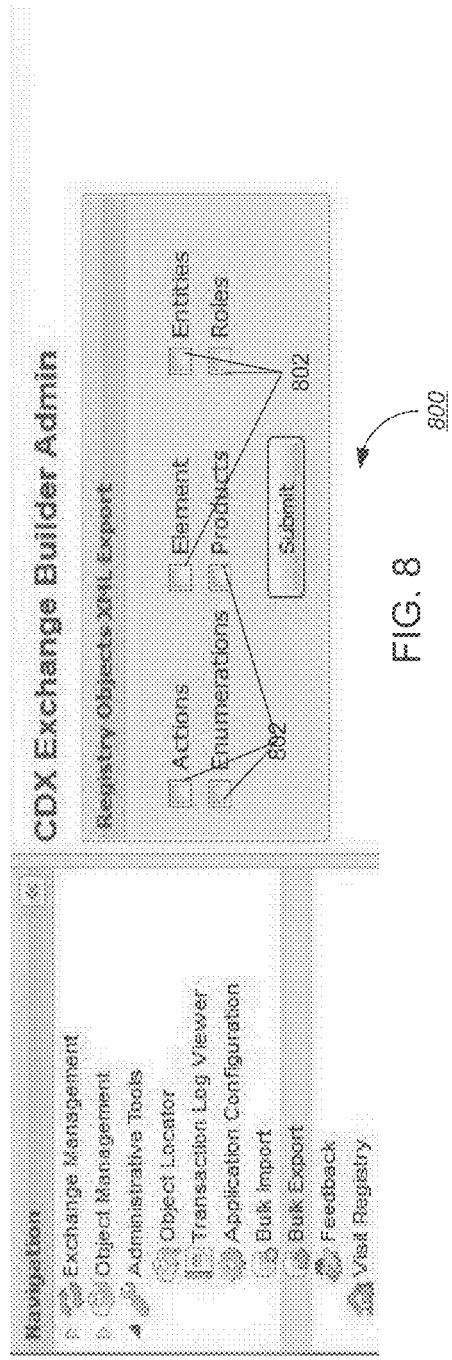
FIG. 8 illustrates an example of providing a graphical interface to enable users to export objects into a registry or repository to an external resource.

FIG. 8 illustrates an example of providing a graphical interface 800 to enable users to export objects into a registry or repository to an external resource. As shown in this example, object type selections may be presented in the graphical interface to indicate that those object types may be exported to an external resource, such as a file, a spread sheet, a database table, and/or any other external resources. For enabling users to select the object types for exporting, selection boxes 802 are provided in the graphical user interface 800 in this example. In response to one or more selections of the object types via the selection boxes 802, a command or commands that initiate exporting registry or repository objects having those object types may be generated.

FIG. 9 illustrates a method 900 of promotion a conceptual object in a local registry to a global registry. The operations of method 900 presented below are intended to be illustrative. In some embodiments, method 900 may be accomplished with one or more additional operations not described, and/or without one or more of the operations discussed. Additionally, the order in which the operations of method 900 are illustrated in FIG. 9 and described below is not intended to be limiting.

In some embodiments, method 900 may be implemented in one or more processing devices (e.g., a digital processor, an analog processor, a digital circuit designed to process information, an analog circuit designed to process information, a state machine, and/or other mechanisms for electronically processing information). The one or more processing devices may include one or more devices executing some or all of the operations of method 900 in response to instructions stored electronically on an electronic storage medium. The one or more processing devices may include one or more devices configured through hardware, firmware, and/or software to be specifically designed for execution of one or more of the operations of method 900.

At operation 902, a global registry may be managed. The global registry may provide conceptual objects corresponding to data elements and/or object types of a global information exchange standard, which may provide a basis on which information exchanges may be developed. The global information exchange standard facilitated by the global registry may provide best practice and/or guidelines, e.g., by defining elements, syntax, and/or structures for information exchanges (e.g., such as NIEM), standardized process for conducting information exchanges (e.g., the The Nationwide Suspicious Activity Reporting (SAR) Initiative (NSI)), international information standards (e.g., such as the ISO/IEC 11179 standard for representing metadata for an organization), standards established for exchanging information related to a general purpose (e.g., the ASC X12 standard for exchanging business transaction information, the HL 7 standard for exchanging information related to clinical patient care and the management, delivery, and evaluation of health care services, the IHE standard for exchanging information related to healthcare information, and/or any other standards established for exchanging information related to a general purpose), the and/or any other global information exchange standard. In some implementations, operation 902 may be performed by an global registry management module the same as or similar to global registry management module 106 (shown in FIG. 1 and described herein).

At operation 904, a promotion request for promoting a conceptual object in a local registry associated with an individual domain to the global registry may be received. The individual domain may include organizations, agencies, departments, subsidiaries, local governments, and/or any other logical groups characterized by specific functions, features, responsibilities, and/or line of businesses. A promotion request may be generated by, for example, by an administrator, developer, provider or any other entities related to information exchange for the domain to promote the conceptual objects in a local registry associated with the domain to the global registry managed in operation 902. The promotion request may include information identifying the conceptual object in the local registry to be promoted to the global registry, one or more developers or entities that created the objects in the local registry, textual descriptions of the conceptual object, textual descriptions of a reason or reasons why the objects may be promoted to the global registry, and/or any other information facilitating promotion of the conceptual object to the global registry. The promotion request may be communicated and received via any suitable wireless or wired connections between a domain server associated with the individual domain and a server that manage the global registry as described in operation 902. In some implementations, operation 904 may be performed by a promotion receipt module the same as or similar to promotion receipt module 108 (shown in FIG. 1 and described herein).

At operation 906, review information regarding the promotion request received in the operation 904 may be obtained. In some implementations, operation 906 may be performed by a promotion review module the same as or similar to promotion review module 110 (shown in FIG. 1 and described herein).

At operation 908, a determination whether the promotion request received in the operation 904 is approved based on the review information obtained in operation 906 is made. In some implementations, operation 906 may be performed by a promotion review module the same as or similar to promotion review module 110 (shown in FIG. 1 and described herein). As shown, in cases where it is determined that the review information obtained in operation 906 does not indicate an approval of promoting the conceptual object from the local registry to the global registry, method 900 proceeds to an end. In cases where such an approval is determined, method 900 may proceed to operation 910.

At operation 910, the conceptual object being requested to be promoted by the promotion request received in operation 904 is provided in the global registry. In some implementations, operation 910 may be performed by a global registry provision module the same as or similar to global registry provision module 112 (shown in FIG. 1 and described herein).

FIG. 10 illustrates a method 1000 of obtaining and communicating promotion requests for promoting conceptual objects in a local registry and exchange objects in a repository to a global registry. The operations of method 1000 presented below are intended to be illustrative. In some embodiments, method 1000 may be accomplished with one or more additional operations not described, and/or without one or more of the operations discussed. Additionally, the order in which the operations of method 1000 are illustrated in FIG. 10 and described below is not intended to be limiting.

In some embodiments, method 1000 may be implemented in one or more processing devices (e.g., a digital processor, an analog processor, a digital circuit designed to process information, an analog circuit designed to process information, a state machine, and/or other mechanisms for electronically processing information). The one or more processing devices may include one or more devices executing some or all of the operations of method 1000 in response to instructions stored electronically on an electronic storage medium. The one or more processing devices may include one or more devices configured through hardware, firmware, and/or software to be specifically designed for execution of one or more of the operations of method 1000.

At operation 1002, a repository of exchange objects may be managed. The exchange objects may correspond to data elements of exchange artifacts that facilitate the actual information exchanges. The exchange objects may include product objects that may be may be used to specify data content—i.e., the payload of the information exchanges. The product objects may represent logic models based on business use semantics of an individual domain. In some implementations, operation 1002 may be performed by a repository module the same as or similar to repository module 126 (shown in FIG. 1 and described herein).

At operation 1004, a local registry of conceptual objects may be managed. The local registry of conceptual objects may correspond to data elements of an information exchange standard for the domain, e.g., a local information exchange standard. In some examples, the conceptual objects in the local registry may include conceptual objects representing augmentations to corresponding conceptual object in a global registry, conceptual objects created for the domain based on a data model determined by an administrator, developer, provider, and/or any other entities related to establishing a local information exchange standard for the domain. In some implementations, operation 1002 may be performed by a local registry module the same as or similar to local registry module 128 (shown in FIG. 1 and described herein).

At operation 1004, promotion requests for promoting the conceptual objects in the local registry managed in operation 1004, and/or for promoting exchange objects in the repository to a global registry may be obtained. In some implementations, operation 1002 may be performed by a promotion request module the same as or similar to promotion request module 130 (shown in FIG. 1 and described herein).

At operation 1006, communication of the promotion requests obtained in the operation 1006 to a global registry server that manage the global registry may be effectuated. In some implementations, operation 1002 may be performed by a promotion request module the same as or similar to promotion request module 130 (shown in FIG. 1 and described herein).

FIG. 11 illustrates a method 1100 of enabling users to compose an exchange object in accordance with the disclosure. The operations of method 1100 presented below are intended to be illustrative. In some embodiments, method 1100 may be accomplished with one or more additional operations not described, and/or without one or more of the operations discussed. Additionally, the order in which the operations of method 1100 are illustrated in FIG. 11 and described below is not intended to be limiting.

In some embodiments, method 1100 may be implemented in one or more processing devices (e.g., a digital processor, an analog processor, a digital circuit designed to process information, an analog circuit designed to process information, a state machine, and/or other mechanisms for electronically processing information). The one or more processing devices may include one or more devices executing some or all of the operations of method 1100 in response to instructions stored electronically on an electronic storage medium. The one or more processing devices may include one or more devices configured through hardware, firmware, and/or software to be specifically designed for execution of one or more of the operations of method 1100.

At operation 1102, a graphical user interface for composing an exchange object may be provided. The exchange object may include a product object and/or any other exchange objects. The exchange object may be stored in a repository, local registry, and/or global registry described above. In some implementations, operation 1102 may be performed by an interface module the same as or similar to interface module 148 (shown in FIG. 1A and described herein).

At operation 1104, a user selection of an object provided by a local registry for inclusion in the exchange object to be composed may be obtained. The object provided by the local registry may include a conceptual object, a product object, and/or any other objects provided in the local registry. In some implementations, operation 1104 may be performed by an object module the same as or similar to object module 140 shown in FIG. 1A and described herein).

At operation 1106, a user selection of a standardized object provided by a global registry may be obtained for inclusion in the exchange object to be composed. The standardized object may include conceptual objects, product objects, and/or any other objects provided by the global registry. In some implementations, operation 1106 may be performed by an object module the same as or similar to object module 140 (shown in FIG. 1A and described herein).

At operation 1108, a user specification or specifications of business use semantics to be applied to the objects obtained in operations 1104 and 1106 may be obtained. The business use semantics may include required and/or optional elements for those objects to be included in the exchange object, conditions for use, business rules, constraints and/or any other business use semantics. In some implementations, operation 1108 may be performed by an exchange object composition module the same as or similar exchange object composition module 142 shown in FIG. 1A and described herein).

FIG. 12 illustrates a method 1200 of enabling users to generate exchange artifacts in accordance with the disclosure. The operations of method 1200 presented below are intended to be illustrative. In some embodiments, method 1200 may be accomplished with one or more additional operations not described, and/or without one or more of the operations discussed. Additionally, the order in which the operations of method 1200 are illustrated in FIG. 12 and described below is not intended to be limiting.

In some embodiments, method 1200 may be implemented in one or more processing devices (e.g., a digital processor, an analog processor, a digital circuit designed to process information, an analog circuit designed to process information, a state machine, and/or other mechanisms for electronically processing information). The one or more processing devices may include one or more devices executing some or all of the operations of method 1200 in response to instructions stored electronically on an electronic storage medium. The one or more processing devices may include one or more devices configured through hardware, firmware, and/or software to be specifically designed for execution of one or more of the operations of method 1200.

At operation 1202, a graphical user interface for generating exchange artifacts may be provided. The exchange artifacts may include any tangible and potentially reusable documentations, output pertaining to any existing or potential information exchange, and/or other artifacts. In some examples, the graphical user interface provided in operation 1202 may enable generating one or more artifacts d based on a user composed exchange project and make up an information package documentation (IEPD). In some implementations, operation 1202 may be performed by an interface module the same as or similar to interface module 148 (shown in FIG. 1A and described herein).

At operation 1204, a user selection of an exchange standard the exchange artifacts to be generated may be obtained. The generated exchange artifacts may conform to one or more exchange standards, such as National Information Exchange Model (NIEM), National Law Enforcement Data Exchange (N-DEx), the National Information Exchange Model (NIEM), Health Level Seven (HL7), Accredited Standards Committee X12 (ASC X12), and/or any exchange standard. Accordingly, the user selection obtained in operation 1204 may indicate one of these exchange standard that the exchange artifacts to be generated should conform to. In some implementations, operation 1204 may be performed by an interface module the same as or similar to interface module 148 (shown in FIG. 1A and described herein).

At operation 1206, a user selection of a XML standard the exchange artifact should conform to may be obtained. In some implementations, operation 1206 may be performed by an interface module the same as or similar to interface module 148 (shown in FIG. 1A and described herein).

At operation 1208, a user specification of an exchange project based on which the exchange artifact may be generated is obtained. In some implementations, operation 1208 may be performed by an interface module the same as or similar to interface module 148 (shown in FIG. 1A and described herein).

At operation 1210, the exchange artifacts may be generated based on the exchange standard selected in operation 1204, XML standard selected in operation 1206, and the exchange project specified in operation 1208 may be generated. In some implementations, operation 1210 may be performed by an artifact generation module the same as or similar to artifact generation module 146 (shown in FIG. 1A and described herein).

Although the present technology has been described in detail for the purpose of illustration based on what is currently considered to be the most practical and preferred implementations, it is to be understood that such detail is solely for that purpose and that the technology is not limited to the disclosed implementations, but, on the contrary, is intended to cover modifications and equivalent arrangements that are within the spirit and scope of the appended claims. For example, it is to be understood that the present technology contemplates that, to the extent possible, one or more features of any implementation can be combined with one or more features of any other implementation.

What is claimed is:

1. A system configured to provide a global registry to facilitate information exchanges, the system comprising:
one or more processors configured to execute computer program modules, the computer program modules comprising:
a global registry management module configured to manage a global registry of conceptual objects corresponding to data elements and/or object types of a global information exchange standard;
a promotion receipt module configured to receive promotion requests for promoting conceptual objects in local registries associated with individual domains to the global registry such that the promotion receipt module receives a first promotion request for promoting a first conceptual object in a first local registry to the global registry;
a promotion review module configured to obtain review information indicating approvals of the promotion requests received by the promotion receipt module such that responsive to the first promotion request being received by the promotion receipt module, the promotion review module obtains review information indicating an approval of the first promotion request; and
a global registry provision module configured to provide conceptual objects in the global registry to client computers associated with developers of the information exchanges such that responsive to the review information indicating the approval of the first promotion request as obtained by the promotion review module, the global registry provision module provides the first conceptual object in the global registry to client computers associated with developers of the information exchanges.

2. The system of claim 1, wherein the global registry management module is configured such that the conceptual objects in the global registry managed by the global registry management module represent entity-relationship concepts and business use semantics for the entity-relationship concepts as established by the global information exchange standard.

3. The system of claim 2, wherein the conceptual objects in the global registry representing entity-relationship concepts comprise information corresponding to entities, roles, actions, elements, or enumerations for facilitating the information exchanges.

4. The system of claim 3, wherein the promotion receipt module is further configured such that the first conceptual object being requested to be promoted to the global registry comprises information corresponding to an entity, a role, an action, an element, a term, or a value list.

5. The system of claim 2, wherein the registry management module is further configured such that the global registry managed by the global registry management module further comprises product objects corresponding to the global information exchange standard.

6. The system of claim 5, wherein the product objects in the global registry indicate relationships of entities, the relationships of the entities being represented by the conceptual objects in the global registry.

7. The system of claim 6, wherein
the promotion receipt module is further configured to receive promotion requests for promoting product objects in repositories associated with the individual domain to the global registry such that the promotion receipt module receives a second promotion request for promoting a first product object in a first local repository to the global registry;
the promotion review module is further configured such that responsive to receiving the second promotion request, the promotion review module obtains review information indicating an approval of the second promotion request; and
the global registry provision module is further configured to provide product objects in the global registry to facilitate the information exchanges between the users such that responsive to the review information indicating the approval of the second promotion request as obtained by the promotion review module, the global registry provision module provides the first product object in the global registry to client computing platforms to facilitate the information exchanges.

8. The system of claim 7, wherein the promotion receipt module is further configured to generate one or more promotion requests to promote conceptual objects included in the first product project.

9. The system of claim 5, wherein the computer programs further comprising an object importation module configured to import from resources external to the system information indicating one or more conceptual objects and/or product objects to the global registry.

10. The system of claim 1, wherein the computer programs further comprise an interface module configured to generate information for providing graphical user interfaces implemented on client computing platforms associated with users to enable user actions to manage the promotion requests received by the promotion receipt module.

11. The system of claim 10, wherein the interface module is configured such that the enabled user actions for managing the promotion requests received by the promotion receipt module comprise an action to approve the promotion requests.

12. The system of claim 1, wherein
the promotion receipt module is further configured such that the promotion receipt module receives a third promotion request for promoting a second conceptual object in a second local registry to the global registry;
the promotion review module is further configured such that responsive to the third promotion request being received by the promotion receipt module, the promotion review module obtains review information indicating an approval of the third promotion request; and
the global registry provision module is further configured such that responsive to the review information indicating the approval of the third promotion request as obtained by the promotion review module, the global registry provision module provides the second conceptual objects in the global registry to client computing platforms to facilitate the information exchanges.

13. A system for providing a repository and a local registry for facilitating information exchanges of a domain, wherein the system comprising:
one or more processors configured to execute computer program modules, the computer program modules comprising:
a repository module configured to manage a repository of exchange objects, the exchange objects including a first product object;
a local registry module configured to manage a local registry of conceptual objects corresponding to data elements of an information exchange standard for the domain, the local registry having a first conceptual object; and
a promotion request module configured to obtain promotion requests for promoting conceptual objects in the local registry managed by the local registry module, and/or for promoting product objects in the repository managed by the repository module to a global registry that facilitates a global information exchange standard such that the promotion request module obtains a first promotion request for promoting the first conceptual object and/or for promoting the first product object to the global registry;
a promotion review module configured to obtain review information indicating approvals of the promotion requests obtained by the promotion request module such that responsive to the first promotion request being obtained by the promotion request module, the promotion review module obtains review information indicating an approval of the first promotion request; and
a global registry provision module configured to provide conceptual objects in the global registry to client computers associated with developers of the information exchanges such that responsive to the review information indicating the approval of the first promotion request as obtained by the promotion review module, the global registry provision module provides the first conceptual object in the global registry to client computers associated with developers of the information exchanges.

14. The system of claim 13, wherein the local registry module is configured such that the conceptual objects in the local registry managed by the local registry module comprises conceptual objects representing entity-relationship concepts.

15. The system of claim 14, wherein the conceptual objects in the local registry representing entity-relationship concepts comprises information corresponding to entities, roles, actions, elements, terms, or enumerations for facilitating the information exchanges.

16. The system of claim 15, wherein the repository module is configured such that the product objects stored in the repository managed by the repository module indicate relationships of entities, the relationships of the entities being represented by the conceptual objects in the local registry.

17. The system of claim 13, wherein the computer programs further comprising an object importation module configured to import from resources external to the one or more conceptual objects to the local registry and/or one or more product objects to the repository.

* * * * *